(12) United States Patent (10) Patent No.: US 8,731,189 B2
Suzaki et al. (45) Date of Patent: May 20, 2014

(54) INFORMATION PROCESSING DEVICE, INFORMATION PROCESSING METHOD

(75) Inventors: Tomoyasu Suzaki, Tokyo (JP); Yukiyasu Tsunoo, Tokyo (JP)

(73) Assignee: NEC Corporation, Tokyo (JP)

( * ) Notice: Subject to any disclaimer, the term of this patent is extended or adjusted under 35 U.S.C. 154(b) by 34 days.

(21) Appl. No.: 13/504,421

(22) PCT Filed: Oct. 26, 2010

(86) PCT No.: PCT/JP2010/068962
§ 371 (c)(1),
(2), (4) Date: Apr. 26, 2012

(87) PCT Pub. No.: WO2011/052585
PCT Pub. Date: May 5, 2011

(65) Prior Publication Data
US 2012/0219150 A1 Aug. 30, 2012

(30) Foreign Application Priority Data
Oct. 27, 2009 (JP) ................. 2009-246306

(51) Int. Cl.
*H04L 9/06* (2006.01)
(52) U.S. Cl.
CPC ............ *H09L 9/0625* (2013.01); *H04L 9/0687* (2013.01)
USPC .............................................. 380/29; 380/37
(58) Field of Classification Search
None
See application file for complete search history.

(56) References Cited

U.S. PATENT DOCUMENTS 6,772,343 B1 * 8/2004 Shimizu et al. ............... 713/193
8,416,947 B2 * 4/2013 Schneider ....................... 380/28
2010/0061548 A1 3/2010 Shirai et al.

FOREIGN PATENT DOCUMENTS

WO 2008/013076 A1 1/2008

OTHER PUBLICATIONS

Taizo Shirai, et al., "On Generalized Feistel Structures Using the Diffusion Switching Mechanism", IEICE Trans. Fundamentals of Electronics, Communications Computer Sciences, Aug. 1, 2008, pp. 2120-2129, vol. E91-A, No. 8.

(Continued)

*Primary Examiner* — Gilberto Barron, Jr.
*Assistant Examiner* — David Le
(74) *Attorney, Agent, or Firm* — Sughrue Mion, PLLC

(57) ABSTRACT

An information processing device comprises: a non-linear transformation unit that takes a k/2-number of odd-numbered string data $B_i$ (i=1, 3, . . . , k−1), k being an even number not smaller than 6, out of a k-number of string data $\{B_1, B_2, \ldots, B_k\}$, as intermediate data $W_i$, and that XORs data transformed from the odd-numbered string data $B_i$ based on a bijective F-function, in which an as-transformed value is determined responsive to a value of key data, and even-numbered string data $B_{i+1}$, to give intermediate data $W_{i+1}$; and a permutation unit that permutes the intermediate data $\{W_1, W_2, \ldots, W_k\}$ by the data $\{B_1, B_2, \ldots, B_k\}$; in so permuting the intermediate data, the permutation unit permuting odd-numbered data by even-numbered data and permuting even-numbered data by odd-numbered data; the permutation unit not permuting $W_{i+1}$ by $B_{((i+1) mod\_k)+1}$, where i=0, 1, 2, . . . , k−1 and x mod y is a remainder left after dividing x by y, and not permuting $W_{i+1}$ by $B_{((i+k-1) mod\_k)+1}$.

7 Claims, 17 Drawing Sheets

(56) References Cited

OTHER PUBLICATIONS

Yuliang Zheng, et al., "On the Construction of Block Ciphers Provably Secure and Not Relying on Any Unproved Hypotheses (Extended Abstract)", Lecture Notes in Computer Science, especially 3.1.2 Type-2 Transformations, 4.2. Enciphering/Deciphering Algorithms for PSBC, 1990, pp. 461-480, vol. 435.

Yukiyasu Tsunoo, et al., "Impossible Differentials for Two Types of Extended Feistel Structure", The 2007 Symposium on Cryptography and Information Security, Sasebo, Japan, Jan. 23-26, 2007, pp. 1-6.

"The 128-bit Blockcipher CLEFIA Security and Performance Evaluations Revision 1.0", Sony Corporation, Jun. 1, 2007, pp. 1-52.

* cited by examiner

FIG. 7

| NUMBER OF DIVISION k | NUMBER OF EX-ORS NEEDED UNTIL EVEN-NUMBERED STRING DATA BECOMES SPREAD OVER THE ENTIRE STRINGS | NUMBER OF TIMES OF COLLISIONS | COLLISION RATIO (%) |
|---|---|---|---|
| 2 | 2 | 0 | 0 |
| 4 | 8 | 1 | 16.7 |
| 6 | 18 | 4 (=1+3) | 22.2 |
| 8 | 32 | 9 (=1+3+5) | 28.1 |
| 10 | 50 | 16 (=1+3+5+7) | 32.0 |
| 12 | 72 | 25 (=1+3+5+7+9) | 34.7 |
| 14 | 98 | 36 (=1+3+5+7+9+11) | 36.7 |
| 16 | 128 | 49 (=1+3+5+7+9+11+13) | 38.3 |

FIG. 12

| NUMBER OF DIVISIONS k | NUMBER OF ROUNDS UNTIL EVEN-NUMBERED STRING DATA HAS BECOME SPREAD TO THE ENTIRE STRINGS | NUMBER OF ROUNDS OF IMPOSSIBLE DIFFERENTIAL CHARACTERISTIC | NUMBER OF ROUNDS OF SATURATION CHARACTERISTIC |
|---|---|---|---|
| 6 | 5 | 9 | 10 |
| 8 | 6 | 10~11 | 11 |
| 10 | 7 | 12~13 | 13 |
| 12 | 8 | 14~17 | 14~16 |
| 14 | 8 | 14~15 | 15~16 |
| 16 | 8 | 14~15 | 15~16 |

INFORMATION PROCESSING DEVICE, INFORMATION PROCESSING METHOD

CROSS REFERENCE TO RELATED APPLICATIONS

This application is a National Stage of International Application No. PCT/JP2010/068962 filed Oct. 26, 2010, claiming priority based on Japanese Patent Application No. 2009-246306 filed Oct. 27, 2009, the contents of all of which are incorporated herein by reference in their entirety.

TECHNICAL FIELD

Related Application

The present application asserts priority rights based on JP Patent Application No. 2009-246306 filed on Oct. 27, 2009. The total contents of disclosure of the patent application of the senior filing date are to be incorporated by reference into the present application. This invention relates to an information processing device, an information processing method and a medium. More particularly, it relates to an information processing device, an information processing method and a medium which are based on a common-key block cipher to hide data in data communication or storage.

BACKGROUND

As a technique for hiding communication data or stored data, there is a common-key block cipher. In the block cipher, data to be encrypted is divided in units, termed block lengths, for encryption. Representative of the block cipher is DES (Data Encryption Standard). In the DES, a structure termed a Feistel structure was adopted for the first time.

FIG. 1 shows the processing for one round of the Feistel structure with a block length of 2n bits. Input data are divided into two n-bit data $B_1$, $B_2$. The data $B_1$ and key data $K_r$ are mashed or stirred with a function F. An exclusive-or (XOR) of output mashed or stirred data and the data $B_2$ is found ($B_1'$). The data $B_1$ is directly to be $B_2'$. $B_1'$ and $B_2'$ are to be inputs to the next round.

In Non-Patent Document 1, a generalized Feistel structure, in which the number of divisions of the Feistel structure is expanded to not less than two, is proposed. This generalized Feistel structure is referred to in the Non-Patent Document 1 as the Feistel-type transformation (FTT). In Non-Patent Document 1, three types of the structures of type-1 to type-3 are proposed. Here, only the type-2 structure is explained. In the following, the 'generalized Feistel structure' means the type-2 structure, unless otherwise specified.

FIG. 2 shows a round of the generalized Feistel structure in which input data are divided into a k-number of data, where k denotes an even number not less than 2. Each of the k-numbers of data resulting from the division is termed a 'string'. This generalized Feistel structure is referred to below as a 'k-number string generalized Feistel structure'. The one-round processing on the generalized Feistel structure will now be considered as the processing is divided into that by a non-linear transformation unit 20 and that by a permutation unit 21. The non-linear transformation unit 20 directly outputs data $B_i$ of k input data, where i denotes an odd number not larger than k. The non-linear transformation unit also mashes the input data $B_i$ with key data $K_j$ (j=(i+1)/2), by a function F, and XORs the mashed data with data $B_{i+1}$ to output the result of the XOR calculations. The permutation unit 21 performs the permutation of cyclic shift of the string data towards left by one string.

Next, the relation between the large/small value of the number of strings k of the generalized Feistel structure and the merit (or the demerit) will be scrutinized. If, in a block cipher with equal block lengths, the number of division k is increased, the size of string data becomes small. For example, in a block length of 128 bits, k=2, n=64. If k=4, n=32 and, if k=8, n=16. If the size of the string data becomes small, the size of processing of the F-function also becomes small. The F-function is the processing that most appreciably influences the implementation scale, such that, if the processing size of the F-function becomes smaller, implementation to a small scale becomes possible to advantage.

On the other hand, if the number of division k is increased, the threat of the cryptoanalytic technique, such as impossible differential attack or saturation attack, increases to disadvantage, in a known manner. It is noted that, to consider detailed cryptoanalysis, it is necessary to take the inner structure of the F-function into account. However, to scrutinize into the influence of the number of strings of the generalized Feistel structure, the F-function is treated here simply as bijective non-linear transformation.

Non-Patent Document 2 shows that the impossible differential characteristics of the generalized Feistel structure with the numbers of strings of 2, 4, 8 and 16 are 5, 9, 17 and 33 rounds. Non-Patent Document 3 shows the impossible differential characteristic of a four-string generalized Feistel structure.

From these results, it is seen that a differential value applied to an input side of the k-string generalized Feistel structure passes through k rounds, while a differential values applied to its output side passes back through k rounds. Since inconsistency occurs at a mid one round, the impossible differential results. Hence, the impossible differential characteristic of 2k+1 rounds persists in the k-string generalized Feistel structure.

The relation between the number of the strings of the generalized Feistel structure and the number of rounds of the saturation characteristics will now be scrutinized. Non-Patent Document 2 states that if, in the case of four strings, total number data are applied along the entire breadth of the string data, there exist six rounds of saturation characteristics from the plaintext towards the ciphertext. Non-Patent Document 2 also states that, since the characteristic may further be extended by two rounds in the direction of the plaintext, there exist eight rounds of the saturation characteristics. In the case of k-strings, the total number data, applied to a given site, becomes diffused or spread to the entire strings after passing through a k-number of rounds. After further passing through three rounds, the data in their entirety become unknown. That is, there exists a k+2 number of rounds of saturation characteristics. In the extension towards the plaintext side, the total number data are diffused to another string after passing back by one round. Hence, the characteristic is diffused as far as (k−1)st string after passing through k−2 rounds. Hence, there exists a 2k-number of rounds of saturation characteristics in the k string generalized Feistel structure.

In the impossible differential attack or the saturation attack, it is attempted to decrypt key data using the above characteristics. The concrete sequence of the impossible differential attack is stated as an example in Non-Patent Document 2. Since routine block cipher attack attempts cryptoanalysis using certain characteristics, the cipher becomes weaker the greater the number of rounds of the characteristics. Thus, in order for the cipher to be strong against such cryptoanalysis, larger numbers of rounds of encryption are necessary. If conversely it is possible to reduce the number of rounds of the characteristics, it becomes possible to secure safety with a smaller number of rounds.

Non-Patent Document 1: Y. Zheng, T. Matsumoto, H. Imai, "On the Construction of Block Ciphers Provably Secure and Not Relying on Any Unproved Hypotheses," CRYPTO 1989, LNCS vol. 435, pp. 461-480, Springer-Verlag, 1990.

Non-Patent Document 2: Yukiyasu Tsunoo, Etsuko Tsujihara, Hiroki Nakashima and Hiroyasu Kubo, "Impossible Differentials for Two Types of Extended Feistel Structure," 2007 Cipher and Information Security Symposium, Jan. 23, 2007.

Non-Patent Document 3: Sony Cooperation, "The 128-bit Blockcipher CLEFIA Security and Performance Evaluations Revision 1.0," Jun. 1, 2007.

SUMMARY

The entire of disclosures of the Non-Patent Documents 1 to 3 are to be incorporated herein by reference.

The following is an analysis made by the present invention.

If, in the generalized Feistel structure, the number of division k is increased, the impossible differential characteristic and the saturation characteristic are also increased. It is thus necessary to increase the number of rounds for encryption. Here, the factors responsible for the impossible differential characteristic and the saturation characteristic of the generalized Feistel structure are investigated from the perspective of data diffusion (or data spreading) performance. The impossible differential characteristic, shown in the Non-Patent Document 2, exploits the fact that the differential values entered as input or output persist with a probability of 1.

FIG. 3 shows the state of diffusion of the differential in the generalized Feistel structure with six strings. A differential value entered to a string 2 (thick solid line), passes with a probability 1 as far as data 30 of the string 2 after passing through six rounds. In the generalized Feistel structure, data is branched at a site of input of the F-function, such as a branch point 31. Branched data is entered to the F-function and changes to an optional differential value (indicated by a broken line). The differential value not entered to the F-function passes to the next round without being changed. Thus, for the initial differential value to be erased, an XOR must be found between it and an arbitrary differential value generated by the F-function. However, in the rounds 1, 3 and 5, only zero values are output as differential values from the F-functions, so that the differential value as such is not changed. However, after the round 6, arbitrary differential values different from 0 are propagated to the entire strings. Hence, the differential value passing through the rounds with the probability 1 ceases to exist after further one round. In the generalized Feistel structure, the permutation unit 21 of which is simple cyclic shift, such property endures without dependency on the number of division k. Thus, the larger the number of division k, the larger becomes the number of rounds traversed with the probability 1.

FIG. 4 shows an example of saturation characteristics. "A" shows the state where total number of data appear and "B" shows the total sum of data in a balanced state (zero). "U" stands for the state where it is not known whether the total sum of data is balanced, and "C" stands for a constant. That is, FIG. 4 shows transitions of saturation characteristic, in case the total data conforming to a data width are delivered to the string 2 and constants are delivered to the other strings. If the F-function is bijective, and total data is delivered, total data is output, and hence the total data state is maintained. If an XOR of total data, which are inherently the same data, is calculated, a balanced state is produced. If the balanced state passes through the F-function, the result is in unknown state. If once data becomes in unknown state, it keeps on to remain unchanged, that is, remains in the unknown state. In the example shown in FIG. 4, the balanced state is left in six strings after the data traversed eight rounds. Such state may be used to attempt saturation attack. This balanced state is generated by calculating the XOR of total number data 40, 41 in the round 7. Up to the round 6, the state of the string 2 is a constant and hence the total data state is maintained in the string 1 of the next round. The total number data 41, branched at the round 2, is maintained. The total number data 41, branched in the round 2, is XORed only in the round 7, where the total data state is erased. Since such property persists without dependency upon the number of division k, the saturation characteristic persists for k+2 rounds with the k-number of division.

FIG. 5 shows extension of the saturation characteristic towards the plaintext side. Such method for extension is shown for example in Non-Patent Document 3. If processing passes back one round, the total number data increases by one string. Hence, if the number of division is equal to k, k−2 round extension is possible.

From above it is seen that, for the number of division equal to k, there exists 2k (=(k+2)+(k−2)) round saturation characteristic. If the properties of the impossible differential characteristic and the saturation characteristic are taken into account, the number of rounds of these characteristics may be reduced by reducing the number of rounds of propagation of string data to the entire strings. By so doing, it becomes possible to improve the proofness against attacks exploiting these characteristics.

Hence, FIG. 3 is re-checked from the perspective of data diffusion. If attention is focused on the string 6 of the round 4, one of data of the string 1, branched in the round 2, is further branched in the string 5. However, the branched data undergoes collision in an XOR 32 of the string 6. In the round 4, propagation is not as yet to the strings 3, 4. Thus, from the perspective of propagation, if data of the string 5 can propagate to the string 4, the number of the rounds for data to be spread to the entire strings may be reduced. In the case of the six strings, collision occurs at four places of the XORs 32 to 35 until propagation to the total of the strings. Thus, FIG. 3 may not be said to be efficient from the perspective of diffusion (or spreading) performance in case the permutation means is cyclic shift.

FIG. 6 shows the state of spreading in case of eight strings. A total of nine collisions of XORs 60 to 68 occur until data of the string 1 propagates to the total of the strings.

FIG. 7 shows, in a tabulated form, the number of times of XORs needed until even-numbered string data propagate to the entire strings, for each of the numbers of division k, the number of times of occurrence of collisions and the ratio of the collisions. Reference to FIG. 7 indicates that the larger the number of the strings, the greater becomes the number of the collisions, thus testifying to poor efficiency.

It is seen that a regular structure of the permutation unit in which data is cyclically shifted towards left on the string-by-string basis may not be said to be good in the data spreading performance, resulting in increasing the impossible differential characteristic or the saturation characteristic. A larger number of division k gives a merit that the F-function may be reduced in size. However, it increases the number of rounds for which the impossible differential attack or the saturation attack may be applied. It is thus necessary, as a countermeasure, to increase the number of rounds of encryption, resulting in a decreased processing speed counted as a drawback.

Therefore, there is a need in the art to provide an information processing device, an information processing method, and a medium that improve proofness against the impossible differential attack or the saturation attack to the k-string generalized Feistel type common-key block cipher without increasing size of implementation.

According to a first aspect of the present invention, there is provided an information processing device, comprising:
a non-linear transformation unit that takes a k/2-number of odd-numbered string data $B_i$ (i=1, 3, . . . , k−1), k being an even number not smaller than 6, out of a k-number of string data $\{B_1, B_2, \ldots, B_k\}$, as intermediate data $W_i$, and that XORs data transformed from the odd-numbered string data $B_i$ based on a bijective F-function, in which an as-transformed value is determined responsive to a value of key data, and even-numbered string data $B_{i+1}$, to give intermediate data $W_{i+1}$; and
a permutation unit that permutes the intermediate data $\{W_1, W_2, \ldots, W_k\}$ by the data $\{B_1, B_2, \ldots, B_k\}$; in so permuting the intermediate data, the permutation unit permuting odd-numbered data by even-numbered data and permuting even-numbered data by odd-numbered data; the permutation unit not permuting $W_{i+1}$ by $B_{((i+1)mod\_k)+1}$, where i=0, 1, 2, . . . , k−1 and x mod y is a remainder left after dividing x by y, and not permuting $W_{i+1}$ by $B_{((i+k-1)mod\_k)+1}$.

According to a second aspect of the present invention, there is provided an information processing method, comprising:
taking a k/2-number of odd-numbered string data $B_1$ (i=1, 3, . . . , k−1), k being an even number not smaller than 6, out of a k-number of string data $\{B_1, B_2, \ldots, B_k\}$, as intermediate data $W_i$, and XORing data transformed from the odd-numbered string data $B_1$ based on a bijective F-function, in which an as-transformed value is determined responsive to a value of key data, and even-numbered string data $B_{i+1}$, to give intermediate data $W_{i+1}$; and
permuting the intermediate data $\{W_1, W_2, \ldots, W_k\}$ by the data $\{B_1, B_2, \ldots, B_k\}$; in so permuting the intermediate data, permuting odd-numbered data by even-numbered data and permuting even-numbered data by odd-numbered data; not permuting $W_{i+1}$ by $B_{((i+1)mod\_k)+1}$, where i=0, 1, 2, . . . , k−1 and x mod y is a remainder left after dividing x by y, and not permuting $W_{i+1}$ by $B_{((i+k-1)mod\_k)+1}$.

According to a third aspect of the present invention, there is provided a non-transient computer-readable storage medium storing a program that cause a computer to execute:
taking a k/2-number of odd-numbered string data $B_1$ (i=1, 3, . . . , k−1), k being an even number not smaller than 6, out of a k-number of string data $\{B_1, B_2, \ldots, B_k\}$, as intermediate data $W_i$, and XORing data transformed from the odd-numbered string data $B_1$ based on a bijective F-function, in which an as-transformed value is determined responsive to a value of key data, and even-numbered string data $B_{i+1}$, to give intermediate data $W_{i+1}$; and
permuting the intermediate data $\{W_1, W_2, \ldots, W_k\}$ by the data $\{B_1, B_2, \ldots, B_k\}$; in so permuting the intermediate data, the permutation processing permuting odd-numbered data by even-numbered data and permuting even-numbered data by odd-numbered data; the permutation processing not permuting $W_{i+1}$ by $B_{((i+1)mod\_k)+1}$, where i=0, 1, 2, . . . , k−1 and x mod y is a remainder left after dividing x by y, and not permuting $W_{i+1}$ by $B_{((i+k-1)mod\_k)+1}$.

The present invention provides the following advantage, but not restricted thereto. In the information processing device and method and the medium, according to the present invention, it is possible to improve the proofness against the impossible differential attack and the saturation attack of the k-string generalized Feistel common-key block cipher without increasing the implementation scale.

BRIEF DESCRIPTION OF THE DRAWINGS

FIG. 7 shows the number of times and the ratio of collisions that occur in the course of data spreading per division number of the generalized Feistel structure.

FIG. 12 shows, for each division number, the number of rounds needed for data to spread over the total of the strings, the number of rounds of the impossible differential characteristic and the number of rounds of the saturation characteristic for each division number.

PREFERRED MODES

Figure 1:
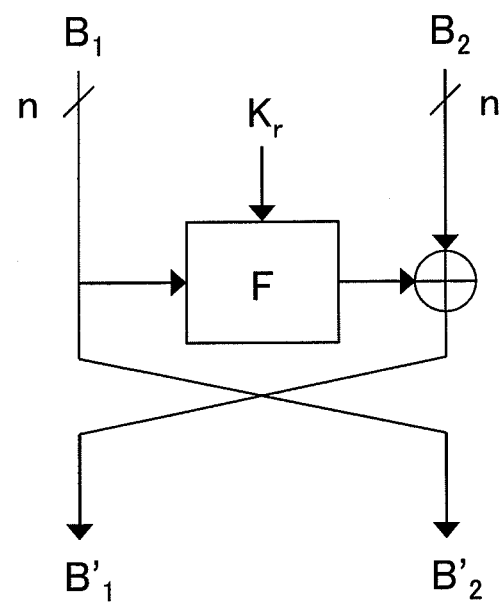
FIG. 1 shows an example of one round of a Feistel structure.
Figure 2:
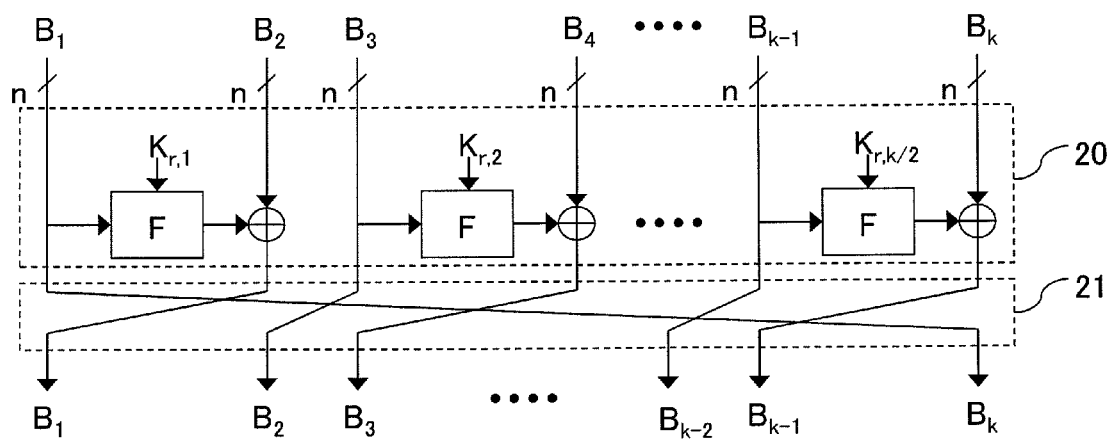
FIG. 2 shows an example of one round of a k-string generalized Feistel structure.

In the present disclosure, there are various possible modes, which include the following, but not restricted thereto.

An information processing device of a first mode may be an information processing device according to the first aspect.

In an information processing device of a second mode, if, in the processing by the permutation unit of permuting the intermediate data $W_x$ (x=1, 2, . . . , k) by $B_{p[X]}$ is expressed by $\pi_k = \{p[0], p[1], \ldots, p[k]\}$, and if the k strings are six strings, preferably $\pi_6=\{2, 3, 6, 1, 4, 5\}$;
if the k strings are eight strings, preferably
$\pi_8=\{2, 3, 6, 7, 8, 5, 4, 1\}$,
$\pi_8=\{4, 5, 2, 3, 8, 1, 6, 7\}$, or
$\pi_8=\{2, 5, 4, 7, 8, 1, 6, 3\}$;
if the k strings are ten strings, preferably
$\pi_{10}=\{2, 3, 10, 5, 4\ 9, 6, 7, 8, 1\}$,
$\pi_{10}=\{2, 3, 10, 5, 8, 9, 4, 7, 6, 1\}$,
$\pi_{10}=\{6, 3, 2, 7, 4, 5, 10, 1, 8, 9\}$,
$\pi_{10}=\{2, 3, 6, 7, 8, 9, 4, 1, 10, 5\}$, or
$\pi_{10}=\{2, 5, 8, 3, 10, 1, 4, 9, 6, 7\}$;
if the k strings are 12 strings, preferably
$\pi_{12}=\{2, 3, 4, 5, 8, 1, 10, 11, 6, 7, 12, 9\}$,
$\pi_{12}=\{2, 3, 4, 5, 8, 9, 10, 11, 6, 1, 12, 7\}$,
$\pi_{12}=\{2, 3, 6, 1, 4, 7, 10, 5, 8, 11, 12, 9\}$,
$\pi_{12}=\{2, 3, 6, 1, 4, 7, 10, 11, 12, 9, 8, 5\}$,
$\pi_{12}=\{2, 3, 6, 1, 8, 9, 4, 5, 12, 7, 10, 11\}$,
$\pi_{12}=\{2, 3, 6, 1, 8, 9, 4, 11, 10, 7, 12, 5\}$,
$\pi_{12}=\{2, 3, 6, 1, 8, 9, 10, 5, 4, 11, 12, 7\}$,
$\pi_{12}=\{2, 3, 6, 1, 8, 9, 10, 11, 4, 7, 12, 5\}$,
$\pi_{12}=\{2, 3, 6, 7, 4, 9, 10, 11, 12, 1, 8, 5\}$,
$\pi_{12}=\{2, 3, 6, 7, 4, 9, 12, 1, 8, 5, 10, 11\}$,
$\pi_{12}=\{2, 3, 6, 7, 4, 9, 12, 5, 8, 11, 10, 1\}$,
$\pi_{12}=\{2, 3, 6, 7, 8, 1, 10, 11, 4, 5, 12, 9\}$,
$\pi_{12}=\{2, 3, 6, 7, 8, 1, 10, 11, 12, 5, 4, 9\}$,
$\pi_{12}=\{2, 3, 6, 7, 8, 5, 10, 11, 4, 1, 12, 9\}$,
$\pi_{12}=\{2, 3, 6, 7, 8, 5, 10, 11, 12, 1, 4, 9\}$,
$\pi_{12}=\{2, 3, 6, 7, 8, 5, 10, 11, 12, 9, 4, 1\}$,
$\pi_{12}=\{2, 3, 6, 7, 8, 9, 4, 1, 12, 5, 10, 11\}$,
$\pi_{12}=\{2, 3\ 6, 7, 8, 9, 4, 11, 12, 1, 10, 5\}$,
$\pi_{12}=\{2, 3, 6, 7, 8, 9, 10, 5, 12, 1, 4, 11\}$,
$\pi_{12}=\{2, 3, 6, 7, 8, 9, 10, 11, 12, 5, 4, 1\}$,
$\pi_{12}=\{2, 3, 6, 7, 8, 9, 12, 1, 4, 11, 10, 5\}$,
$\pi_{12}=\{2, 3, 6, 7, 8, 9, 12, 5, 4, 1, 10, 11\}$,
$\pi_{12}=\{2, 3, 6, 7, 8, 9, 12, 5, 10, 11, 4, 1\}$,
$\pi_{12}=\{2, 3, 6, 7, 10, 1, 4, 9, 12, 5, 8, 11\}$,
$\pi_{12}=\{2, 3, 6, 7, 10, 1, 4, 11, 12, 9, 8, 5\}$,
$\pi_{12}=\{2, 3, 6, 7, 10, 1, 12, 9, 8, 5, 4, 11\}$,
$\pi_{12}=\{2, 3, 6, 7, 10, 1, 12, 9, 8, 11, 4, 5\}$,
$\pi_{12}=\{2, 3, 6, 7, 10, 5, 12, 9, 8, 11, 4, 1\}$,
$\pi_{12}=\{2, 3, 6, 7, 10, 11, 4, 5, 8, 1, 12, 9\}$,
$\pi_{12}=\{2, 3, 6, 7, 10, 11, 4, 5, 12, 9, 8, 1\}$,
$\pi_{12}=\{2, 3, 6, 7, 10, 11, 4, 9, 12, 1, 8, 5\}$,
$\pi_{12}=\{2, 3, 6, 7, 10, 11, 8, 9, 12, 1, 4, 5\}$,
$\pi_{12}=\{2, 3, 6, 7, 10, 11, 12, 1, 4, 9, 8, 5\}$,
$\pi_{12}=\{2, 3, 6, 7, 10, 11, 12, 9, 4, 5, 8, 1\}$,
$\pi_{12}=\{2, 3, 6, 7, 10, 11, 12, 9, 4, 5, 8, 1\}$,
$\pi_{12}=\{2, 3, 6, 7, 10, 11, 12, 9, 8, 1, 4, 5\}$,
$\pi_{12}=\{2, 3, 6, 7, 10, 11, 12, 9, 8, 5, 4, 1\}$,
$\pi_{12}=\{4, 1, 2, 5, 8, 3, 6, 9, 12, 7, 10, 11\}$,
$\pi_{12}=\{4, 1, 2, 5, 8, 9, 10, 3, 12, 7, 6, 11\}$,
$\pi_{12}=\{4, 1, 2, 5, 8, 9, 10, 7, 12, 3, 6, 11\}$,
$\pi_{12}=\{4, 1, 2, 5, 8, 9, 12, 3, 6, 7, 10, 11\}$,
$\pi_{12}=\{4, 1, 2, 5, 8, 9, 12, 7, 6, 3, 10, 11\}$,
$\pi_{12}=\{4, 1, 6, 3, 2, 7, 10, 11, 12, 9, 8, 5\}$,
$\pi_{12}=\{4, 1, 6, 7, 2, 9, 12, 5, 8, 11, 10, 3\}$,
$\pi_{12}=\{4, 1, 6, 7, 8, 3, 10, 11, 12, 9, 2, 5\}$,
$\pi_{12}=\{4, 1, 6, 7, 8, 5, 10, 11, 12, 3, 2, 9\}$,
$\pi_{12}=\{4, 1, 6, 7, 8, 9, 12, 3, 2, 11, 10, 5\}$,
$\pi_{12}=\{4, 1, 6, 7, 10, 3, 12, 5, 8, 11, 2, 9\}$,
$\pi_{12}=\{4, 1, 6, 7, 10, 3, 12, 9, 2, 11, 8, 5\}$,
$\pi_{12}=\{4, 1, 6, 7, 10, 5, 12, 9, 2, 11, 8, 3\}$,
$\pi_{12}=\{4, 1, 6, 7, 10, 11, 2, 5, 12, 3, 8, 9\}$,
$\pi_{12}=\{4, 1, 6, 7, 10, 11, 2, 5, 12, 9, 8, 3\}$,
$\pi_{12}=\{4, 1, 6, 7, 10, 11, 2, 9, 12, 5, 8, 3\}$,
$\pi_{12}=\{4, 1, 6, 7, 10, 11, 12, 3, 8, 5, 2, 9\}$,
$\pi_{12}=\{4, 1, 6, 7, 10, 11, 12, 5, 2, 3, 8, 9\}$,
$\pi_{12}=\{4, 1, 6, 7, 10, 11, 12, 9, 2, 3, 8, 5\}$,
$\pi_{12}=\{4, 1, 6, 7, 10, 11, 12, 9, 2, 5, 8, 3\}$,
$\pi_{12}=\{4, 1, 6, 7, 10, 11, 12, 9, 8, 3, 2, 5\}$, or
$\pi_{12}=\{4, 1, 6, 7, 10, 11, 12, 9, 8, 5, 2, 3\}$;
if the k strings are 14 strings, preferably
$\pi_{14}=\{2, 3, 10, 5, 4, 7, 14, 9, 8, 11, 12, 13, 6, 1\}$,
$\pi_{14}=\{2, 3, 10, 5, 14, 7, 8, 9, 6, 11, 4, 13, 12, 1\}$,
$\pi_{14}=\{2, 3, 12, 5, 4, 7, 14, 9, 10, 11, 8, 13, 6, 1\}$,
$\pi_{14}=\{6, 3, 2, 5, 12, 7, 4, 9, 14, 11, 10, 13, 8, 1\}$,
$\pi_{14}=\{6, 3, 10, 5, 2, 7, 14, 9, 8, 11, 4, 13, 12, 1\}$,
$\pi_{14}=\{6, 3, 10, 5, 4, 7, 2, 9, 14, 11, 8, 13, 12, 1\}$,
$\pi_{14}=\{6, 3, 14, 5, 12, 7, 4, 9, 2, 11, 10, 13, 8, 1\}$,
$\pi_{14}=\{2, 3, 8, 5, 4, 7, 14, 9, 6, 13, 10, 11, 12, 1\}$,
$\pi_{14}=\{2, 3, 8, 5, 6, 7, 12, 9, 4, 13, 14, 11, 10, 1\}$,
$\pi_{14}=\{2, 3, 8, 5, 12, 7, 14, 6, 13, 4, 11, 10, 1\}$,
$\pi_{14}=\{2, 3, 10, 5, 4, 7, 8, 9, 12, 13, 14, 11, 6, 1\}$,
$\pi_{14}=\{2, 3, 10, 5, 6, 7, 12, 9, 8, 13, 14, 11, 4, 1\}$,
$\pi_{14}=\{2, 3, 10, 5, 12, 7, 8, 9, 6, 13, 14, 11, 4, 1\}$,
$\pi_{14}=\{2, 3, 12, 5, 10, 7, 4, 9, 8, 13, 14, 11, 6, 1\}$,
$\pi_{14}=\{2, 3, 12, 5, 10, 7, 6, 9, 4, 13, 14, 11, 8, 1\}$,
$\pi_{14}=\{2, 3, 12, 5, 14, 7, 8, 9, 6, 13, 10, 11, 4, 1\}$,
$\pi_{14}=\{2, 3, 14, 5, 10, 7, 6, 9, 4, 13, 8, 11, 12, 1\}$,
$\pi_{14}=\{2, 3, 14, 5, 10, 7, 12, 9, 8, 13, 4, 11, 6, 1\}$,
$\pi_{14}=\{2, 3, 8, 5, 10, 7, 14, 11, 4, 9, 6, 1, 12, 13\}$,
$\pi_{14}=\{2, 3, 10, 5, 4, 7, 14, 11, 8, 9, 6, 1, 12, 13\}$,
$\pi_{14}=\{2, 3, 10, 5, 12, 7, 4, 11, 6, 9, 14, 1, 8, 13\}$,
$\pi_{14}=\{2, 3, 10, 5, 14, 7, 4, 11, 6, 9, 8, 1, 12, 13\}$,
$\pi_{14}=\{2, 3, 10, 5, 14, 7, 6, 11, 8, 9, 4, 1, 12, 13\}$,
$\pi_{14}=\{6, 3, 2, 5, 12, 7, 10, 11, 8, 9, 14, 1, 4, 13\}$,
$\pi_{14}=\{6, 3, 10, 5, 2, 7, 14, 11, 12, 9, 8, 1, 4, 13\}$,
$\pi_{14}=\{6, 3, 10, 5, 4, 7, 2, 11, 8, 9, 14, 1, 12, 13\}$,
$\pi_{14}=\{6, 3, 10, 5, 12, 7, 4, 11, 8, 9, 14, 1, 2, 13\}$,
$\pi_{14}=\{6, 3, 10, 5, 14, 7, 4, 11, 2, 9, 8, 1, 12, 13\}$,
$\pi_{14}=\{6, 3, 12, 5, 10, 7, 14, 11, 4, 9, 8, 1, 2, 13\}$,
$\pi_{14}=\{8, 3, 2, 5, 10, 7, 4, 11, 12, 9, 14, 1, 6, 13\}$,
$\pi_{14}=\{8, 3, 2, 5, 10, 7, 6, 11, 12, 9, 14, 1, 4, 13\}$,
$\pi_{14}=\{2, 3, 8, 5, 4, 7, 10, 11, 12, 13, 6, 1, 14, 9\}$,
$\pi_{14}=\{2, 3, 10, 5, 4, 7, 8, 11, 12, 13, 14, 1, 6, 9\}$,
$\pi_{14}=\{2, 3, 10, 5, 12, 7, 4, 11, 6, 13, 8, 1, 14, 9\}$,
$\pi_{14}=\{8, 3, 2, 5, 10, 7, 6, 11, 4, 13, 14, 1, 12, 9\}$,
$\pi_{14}=\{8, 3, 2, 5, 10, 7, 6, 11, 12, 13, 14, 1, 4, 9\}$,
$\pi_{14}=\{2, 3, 12, 5, 4, 9, 6, 7, 14, 1, 8, 13, 10, 11\}$,
$\pi_{14}=\{2, 3, 12, 5, 8, 9, 14, 7, 6, 1, 4, 13, 10, 11\}$,
$\pi_{14}=\{2, 3, 8, 5, 6, 9, 10, 11, 14, 1, 4, 13, 12, 7\}$,
$\pi_{14}=\{2, 3, 8, 5, 14, 9, 6, 11, 4, 1, 12, 13, 10, 7\}$,
$\pi_{14}=\{8, 3, 2, 5, 14, 9, 6, 11, 12, 1, 4, 13, 10, 7\}$,
$\pi_{14}=\{2, 3, 10, 7, 4, 5, 14, 1, 6, 11, 8, 13, 12, 9\}$,
$\pi_{14}=\{2, 3, 10, 7, 12, 5, 6, 1, 14, 11, 8, 13, 4, 9\}$, or
$\pi_{14}=\{2, 3, 10, 7, 14, 5, 4, 1, 8, 11, 6, 13, 12, 9\}$;
if the k strings are 16 strings, preferably
$\pi_{16}=\{2, 3, 10, 5, 16, 7, 6, 9, 14, 11, 8, 15, 12, 13, 4, 1\}$,
$\pi_{16}=\{2, 3, 12, 5, 14, 7, 16, 9, 6, 11, 10, 15, 8, 13, 4, 1\}$,
$\pi_{16}=\{2, 3, 12, 5, 10, 7, 8, 9, 16, 13, 6, 11, 4, 1, 14, 15\}$,
$\pi_{16}=\{2, 3, 12, 5, 10, 7, 16, 9, 6, 13, 8, 11, 4, 1, 14, 15\}$,
$\pi_{16}=\{6, 3, 10, 5, 2, 7, 12, 9, 16, 13, 4, 11, 8, 1, 14, 15\}$,
$\pi_{16}=\{6, 3, 10, 5, 12, 7, 16, 9, 4, 13, 2, 11, 8, 1, 14, 15\}$,
$\pi_{16}=\{6, 3, 12, 5, 2, 7, 16, 9, 4, 13, 14, 11, 8, 1, 10, 15\}$,
$\pi_{16}=\{2, 3, 10, 5, 12, 7, 8, 9, 16, 13, 14, 15, 4, 1, 6, 11\}$,
$\pi_{16}=\{2, 3, 12, 5, 4, 7, 8, 9, 16, 13, 6, 15, 10, 1, 14, 11\}$,
$\pi_{16}=\{2, 3, 12, 5, 10, 7, 8, 9, 16, 13, 14, 15, 4, 1, 6, 11\}$,
$\pi_{16}=\{2, 3, 12, 5, 10, 7, 8, 9, 16, 13, 14, 15, 6, 1, 4, 11\}$,
$\pi_{16}=\{2, 3, 12, 5, 10, 7, 16, 9, 6, 13, 8, 15, 4, 1, 14, 11\}$,
$\pi_{16}=\{2, 3, 10, 5, 14, 7, 8, 11, 6, 9, 16, 1, 12, 15, 4, 13\}$,
$\pi_{16}=\{6, 3, 14, 5, 2, 7, 10, 11, 12, 9, 16, 1, 8, 15, 4, 13\}$,
$\pi_{16}=\{8, 3, 14, 5, 12, 9, 4, 7, 16, 1, 10, 11, 2, 15, 6, 13\}$,
$\pi_{16}=\{8, 3, 14, 5, 12, 9, 10, 7, 16, 1, 4, 11, 6, 15, 2, 13\}$,
$\pi_{16}=\{2, 3, 12, 5, 16, 9, 4, 7, 8, 1, 10, 13, 6, 15, 14, 11\}$, $\pi_{16}$={2, 3, 8, 5, 16, 9, 14, 11, 4, 1, 12, 13, 10, 15, 6, 7},
$\pi_{16}$={2, 3, 10, 5, 8, 9, 6, 11, 16, 1, 4, 13, 14, 15, 12, 7},
$\pi_{16}$={6, 3, 2, 7, 12, 5, 14, 1, 4, 9, 16, 13, 8, 15, 10, 11},
$\pi_{16}$={6, 3, 12, 7, 4, 5, 16, 1, 14, 9, 10, 13, 2, 15, 8, 11},
$\pi_{16}$={2, 3, 6, 7, 8, 9, 12, 1, 16, 5, 10, 13, 14, 15, 4, 11}, or
$\pi_{16}$={6, 3, 12, 7, 14, 9, 16, 1, 4, 5, 10, 13, 2, 15, 8, 11}.

An information processing device of a third mode may further comprise a plurality of k-string generalized Feistel processing units, each of which includes the non-linear transformation unit and the permutation units.

An information processing device of a fourth mode may further comprise an encryption unit that includes a plurality of k-string generalized Feistel processing units, each of which includes the non-linear transformation unit and the permutation unit, wherein the encryption unit inputs, at the k-string generalized Feistel processing units, a plurality of extended keys generated from key data and plaintext data to encrypt the plaintext data.

An information processing device of a fifth mode may further comprise a decryption unit that includes a plurality of k-string generalized Feistel processing units, each of which includes the non-linear transformation unit and the permutation unit, wherein the decryption unit inputs, at the k-string generalized Feistel processing units, a plurality of extended keys generated from key data and ciphertext data to decrypt the ciphertext data.

An information processing method of sixth mode may further comprise an extended key generation unit that generates a plurality of the extended keys from the key data.

An information processing method of a seventh mode may be an information processing method according to the second aspect.

An information processing method of an eighth mode may further comprise repeating the taking and XORing and the permuting a plural number of times.

An information processing method of a ninth mode may further comprise: receiving a plurality of extended keys generated from the key data and plaintext data; and repeating the taking and XORing and the permuting a plural number of times to encrypt the plaintext data.

An information processing method of a tenth mode may further comprise: receiving a plurality of extended keys generated from the key data and plaintext data; and repeating the taking and XORing and the permuting a plural number of times to decrypt the ciphertext data.

A medium of an eleventh mode may be a medium according to the third aspect.

A medium of a twelfth mode may store a program that causes the computer to execute repeating the taking and XORing non-linear and the permuting a plural number of times.

A medium of a thirteenth mode may store a program that causes the computer to execute: receiving a plurality of extended keys generated from the key data and plaintext data; and repeating the taking and XORing and the permuting a plural number of times to encrypt the plaintext data.

A medium of a fourteenth mode may store a program that causes the computer to execute: receiving a plurality of extended keys generated from the key data and ciphertext data; and repeating the taking and XORing and the permuting a plural number of times to decrypt the ciphertext data.

The medium may be a computer-readable recording medium.

First Exemplary Embodiment

Figure 8:
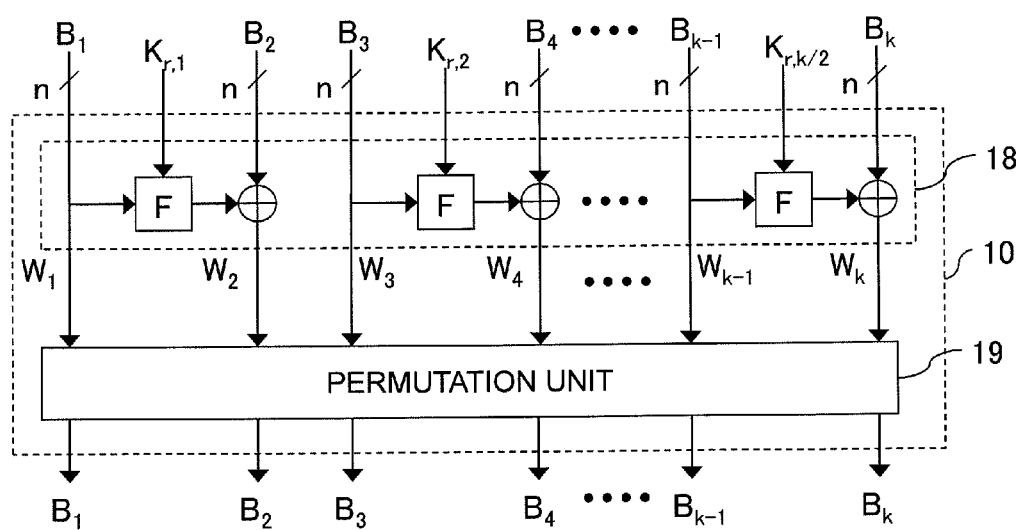
FIG. 8 is a block diagram showing a configuration of an encryption device according to a first exemplary embodiment.

An encryption device according to a first exemplary embodiment will now be described with reference to the drawings. FIG. 8 depicts a block diagram showing an arrangement of an encryption device 10 of the present exemplary embodiment. Referring to FIG. 8, the encryption device 10 includes a non-linear transformation unit 18 and a permutation unit 19.

The non-linear transformation unit 18 takes k/2 odd-numbered string data $B_i$ {i=1, 3, . . . , k−1}, out of k-string data ($B_1$, $B_2$, . . . , $B_k$), where k is an even number not less than 6, as intermediate data $W_i$. Also, the non-linear transformation unit 18 takes the result of XOR of data transformed from the odd-numbered string data $B_i$ based on the bijective F-function, in which an as-transformed value is determined responsive to a key data value, and even-numbered string data $B_{i+1}$ as intermediate data $W_{i+1}$.

In the permutation unit 19, the intermediate data {$W_1$, $W_2$, . . . , $W_k$} are permuted by data {$B_1$, $B_2$, . . . , $B_k$}, on the condition that, in permuting $W_m$ among the intermediate data, m being an arbitrary odd number not larger than k, by $B_n$, n being an arbitrary even number not larger than k, at least one of $B_n$ satisfies the relation of m≠n+2 mod k, where x mod y is a remainder left after dividing x with y, and that, in permuting $W_n$ by $B_m$, at least one of $B_m$ satisfies the relation of m≠n+2 mod k, with $W_{m+i}$ not being permuted by $B_{n-1}$ in permuting $W_m$ by $B_n$.

Preferably, the encryption device 10 includes a plurality of pairs of the non-linear transformation units 18 and the permutation units 19.

Figure 9:
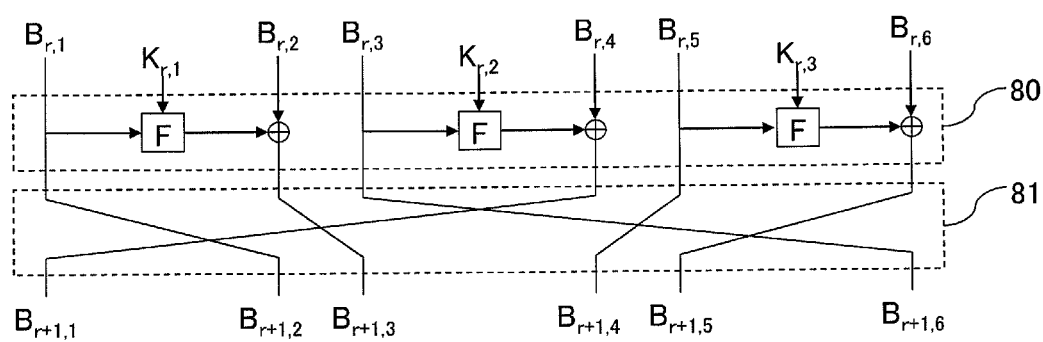
FIG. 9 is a block diagram showing an example configuration of an encryption device (6-string) according to the first exemplary embodiment.

FIG. 9 depicts a diagram showing an arrangement in which the encryption device 10 is applied to a 6-string generalized Feistel structure.

Let six intermediate data output from a non-linear transforming unit 80 be $W_1$, $W_2$, . . . , $W_6$, looking from the left. A permutation unit 81 permutes $W_1$ by $B_{r+1,2}$, $W_2$ by $B_{r+1,3}$, $W_3$ by $B_{r+1,6}$, $W_4$ by $B_{r+1,1}$, $W_5$ by $B_{r+1,4}$ and $W_6$ by $B_{r+1,5}$. This processing of permutation is referred to below as {2, 3, 6, 1, 4, 5}. In this permutation processing, even-numbered strings are permuted by odd-numbered strings, while odd-numbered strings are permuted by even-numbered strings.

Since the odd-numbered string intermediate data $W_i$ is permuted by $B_{r+1,2}$, m=1 and n=2. On the other hand, since $W_3$ (=$W_{m+2}$) is permuted by $B_{r+1,6}$ (=n+4, mod 6), the relation of n=m+2 mod 6 does not hold. In similar manner, since the even-numbered string intermediate data $W_2$ is permuted by $B_{r+1,3}$, n=2 and m=3. Since $W_4$ (=$W_{n+2}$) is permuted by $B_{r+1,1}$ (m+3 mod 6), the relation of m=625 n+2 mod 6 does not hold. It cannot be that the destination of permutation of $W_i$ (i=1, 3, 5) and that of $W_{i+1}$ respectively become $W_j$ and $W_{j-1}$, j being an even number not greater than k.

Figure 10:
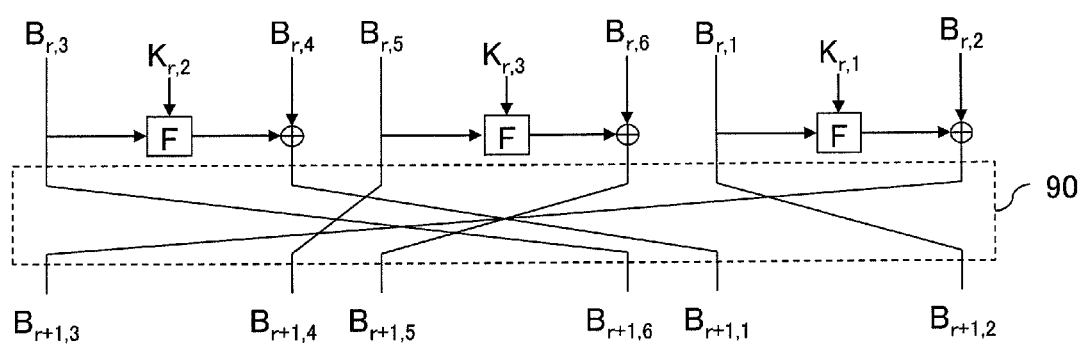
FIG. 10 is a block diagram showing another example configuration of an encryption device (6-string) according to the first exemplary embodiment.

FIG. 10 shows a permutation unit 90 modified in configuration from the permutation unit 81 of the encryption device shown in FIG. 9. Referring to FIG. 10, permutation of the permutation unit 81 is {4, 5, 2, 3, 6, 1} which differs from the permutation of the permutation unit 81 (FIG. 9). However, in the arrangement of FIG. 10, the input data $B_r$ and the output data $B_{r+1}$ of FIG. 9 have been cyclically shifted by two strings towards left. Hence, the relation between the input data and the output data remains the same. Since this relation remains unchanged after repetition of the cyclic shift a plurality of rounds, the mapping of the transformation of FIG. 9 may be regarded to be the same as that of FIG. 10. Hence, the spreading performance of the permutation unit 81 (FIG. 9) is the same as that of the permutation unit 90 (FIG. 10).

In k-numbered strings, there are a number of combinations of such interchanges equal to factorials of k. The permutation units 81, 90 differ from each other insofar as mapping is concerned. Specific examples of the permuting processing in the permutation unit 19 of the encryption device 10 of the present exemplary embodiment are shown below for 8, 10, 12, 14 and 16 strings.
8 strings
{2, 3, 6, 7, 8, 5, 4, 1}
{4, 5, 2, 3, 8, 1, 6, 7}
{2, 5, 4, 7, 8, 1, 6, 3}
10 strings
{2, 3, 10, 5, 4, 9, 6, 7, 8, 1}
{2, 3, 10, 5, 8, 9, 4, 7, 6, 1}
{6, 3, 2, 7, 4, 5, 10, 1, 8, 9}
{2, 3, 6, 7, 8, 9, 4, 1, 10, 5}
{2, 5, 8, 3, 10, 1, 4, 9, 6, 7}
12 strings
{2, 3, 4, 5, 8, 1, 10, 11, 6, 7, 12, 9}
{2, 3, 4, 5, 8, 9, 10, 11, 6, 1, 12, 7}
{2, 3, 6, 1, 4, 7, 10, 5, 8, 11, 12, 9}
{2, 3, 6, 1, 4, 7, 10, 11, 12, 9, 8, 5}
{2, 3, 6, 1, 8, 9, 4, 5, 12, 7, 10, 11}
{2, 3, 6, 1, 8, 9, 4, 11, 10, 7, 12, 5}
{2, 3, 6, 1, 8, 9, 10, 5, 4, 11, 12, 7}
{2, 3, 6, 1, 8, 9, 10, 11, 4, 7, 12, 5}
{2, 3, 6, 7, 4, 9, 10, 11, 12, 1, 8, 5}
{2, 3, 6, 7, 4, 9, 12, 1, 8, 5, 10, 11}
{2, 3, 6, 7, 4, 9, 12, 5, 8, 11, 10, 1}
{2, 3, 6, 7, 8, 1, 10, 11, 4, 5, 12, 9}
{2, 3, 6, 7, 8, 1, 10, 11, 12, 5, 4, 9}
{2, 3, 6, 7, 8, 5, 10, 11, 4, 1, 12, 9}
{2, 3, 6, 7, 8, 5, 10, 11, 12, 1, 4, 9}
{2, 3, 6, 7, 8, 5, 10, 11, 12, 9, 4, 1}
{2, 3, 6, 7, 8, 9, 4, 1, 12, 5, 10, 11}
{2, 3, 6, 7, 8, 9, 4, 11, 12, 1, 10, 5}
{2, 3, 6, 7, 8, 9, 10, 5, 12, 1, 4, 11}
{2, 3, 6, 7, 8, 9, 10, 11, 12, 5, 4, 1}
{2, 3, 6, 7, 8, 9, 12, 1, 4, 11, 10, 5}
{2, 3, 6, 7, 8, 9, 12, 5, 4, 1, 10, 11}
{2, 3, 6, 7, 8, 9, 12, 5, 10, 11, 4, 1}
{2, 3, 6, 7, 10, 1, 4, 9, 12, 5, 8, 11}
{2, 3, 6, 7, 10, 1, 4, 11, 12, 9, 8, 5}
{2, 3, 6, 7, 10, 1, 12, 9, 8, 5, 4, 11}
{2, 3, 6, 7, 10, 1, 12, 9, 8, 11, 4, 5}
{2, 3, 6, 7, 10, 5, 12, 9, 8, 11, 4, 1}
{2, 3, 6, 7, 10, 11, 4, 5, 8, 1, 12, 9}
{2, 3, 6, 7, 10, 11, 4, 5, 12, 9, 8, 1}
{2, 3, 6, 7, 10, 11, 4, 9, 12, 1, 8, 5}
{2, 3, 6, 7, 10, 11, 8, 9, 12, 1, 4, 5}
{2, 3, 6, 7, 10, 11, 12, 1, 4, 9, 8, 5}
{2, 3, 6, 7, 10, 11, 12, 9, 4, 1, 8, 5}
{2, 3, 6, 7, 10, 11, 12, 9, 4, 5, 8, 1}
{2, 3, 6, 7, 10, 11, 12, 9, 8, 1, 4, 5}
{2, 3, 6, 7, 10, 11, 12, 9, 8, 5, 4, 1}
{4, 1, 2, 5, 8, 3, 6, 9, 12, 7, 10, 11}
{4, 1, 2, 5, 8, 9, 10, 3, 12, 7, 6, 11}
{4, 1, 2, 5, 8, 9, 10, 7, 12, 3, 6, 11}
{4, 1, 2, 5, 8, 9, 12, 3, 6, 7, 10, 11}
{4, 1, 2, 5, 8, 9, 12, 7, 6, 3, 10, 11}
{4, 1, 6, 3, 2, 7, 10, 11, 12, 9, 8, 5}
{4, 1, 6, 7, 2, 9, 12, 5, 8, 11, 10, 3}
{4, 1, 6, 7, 8, 3, 10, 11, 12, 9, 2, 5}
{4, 1, 6, 7, 8, 5, 10, 11, 12, 3, 2, 9}
{4, 1, 6, 7, 8, 9, 12, 3, 2, 11, 10, 5}
{4, 1, 6, 7, 10, 3, 12, 5, 8, 11, 2, 9}
{4, 1, 6, 7, 10, 3, 12, 9, 2, 11, 8, 5}
{4, 1, 6, 7, 10, 5, 12, 9, 2, 11, 8, 3}
{4, 1, 6, 7, 10, 11, 2, 5, 12, 3, 8, 9}
{4, 1, 6, 7, 10, 11, 2, 5, 12, 9, 8, 3}
{4, 1, 6, 7, 10, 11, 2, 9, 12, 5, 8, 3}
{4, 1, 6, 7, 10, 11, 12, 3, 8, 5, 2, 9}
{4, 1, 6, 7, 10, 11, 12, 5, 2, 3, 8, 9}
{4, 1, 6, 7, 10, 11, 12, 9, 2, 3, 8, 5}
{4, 1, 6, 7, 10, 11, 12, 9, 2, 5, 8, 3}
{4, 1, 6, 7, 10, 11, 12, 9, 8, 3, 2, 5}
{4, 1, 6, 7, 10, 11, 12, 9, 8, 5, 2, 3}
14 strings
{2, 3, 10, 5, 4, 7, 14, 9, 8, 11, 12, 13, 6, 1}
{2, 3, 10, 5, 14, 7, 8, 9, 6, 11, 4, 13, 12, 1}
{2, 3, 12, 5, 4, 7, 14, 9, 10, 11, 8, 13, 6, 1}
{6, 3, 2, 5, 12, 7, 4, 9, 14, 11, 10, 13, 8, 1}
{6, 3, 10, 5, 2, 7, 14, 9, 8, 11, 4, 13, 12, 1}
{6, 3, 10, 5, 4, 7, 2, 9, 14, 11, 8, 13, 12, 1}
{6, 3, 14, 5, 12, 7, 4, 9, 2, 11, 10, 13, 8, 1}
{2, 3, 8, 5, 4, 7, 14, 9, 6, 13, 10, 11, 12, 1}
{2, 3, 8, 5, 6, 7, 12, 9, 4, 13, 14, 11, 10, 1}
{2, 3, 8, 5, 12, 7, 14, 6, 13, 4, 11, 10, 1}
{2, 3, 10, 5, 4, 7, 8, 9, 12, 13, 14, 11, 6, 1}
{2, 3, 10, 5, 6, 7, 12, 9, 8, 13, 14, 11, 4, 1}
{2, 3, 10, 5, 12, 7, 8, 9, 6, 13, 14, 11, 4, 1}
{2, 3, 12, 5, 10, 7, 4, 9, 8, 13, 14, 11, 6, 1}
{2, 3, 12, 5, 10, 7, 6, 9, 4, 13, 14, 11, 8, 1}
{2, 3, 12, 5, 14, 7, 8, 9, 6, 13, 10, 11, 4, 1}
{2, 3, 14, 5, 10, 7, 6, 9, 4, 13, 8, 11, 12, 1}
{2, 3, 14, 5, 10, 7, 12, 9, 8, 13, 4, 11, 6, 1}
{2, 3, 8, 5, 10, 7, 14, 11, 4, 9, 6, 112, 13}
{2, 3, 10, 5, 4, 7, 14, 11, 8, 9, 6, 112, 13}
{2, 3, 10, 5, 12, 7, 4, 11, 6, 9, 14, 8, 13}
{2, 3, 10, 5, 14, 7, 4, 11, 6, 9, 8, 112, 13}
{2, 3, 10, 5, 14, 7, 6, 11, 8, 9, 4, 112, 13}
{6, 3, 2, 5, 12, 7, 10, 11, 8, 9, 14, 1, 4, 13}
{6, 3, 10, 5, 2, 7, 14, 11, 12, 9, 8, 1, 4, 13}
{6, 3, 10, 5, 4, 7, 2, 11, 8, 9, 14, 1, 12, 13}
{6, 3, 10, 5, 12, 7, 4, 11, 8, 9, 14, 1, 2, 13}
{6, 3, 10, 5, 14, 7, 4, 11, 2, 9, 8, 1, 12, 13}
{6, 3, 12, 5, 10, 7, 14, 11, 4, 9, 8, 1, 2, 13}
{8, 3, 2, 5, 10, 7, 4, 11, 12, 9, 14, 1, 6, 13}
{8, 3, 2, 5, 10, 7, 6, 11, 12, 9, 14, 1, 4, 13}
{2, 3, 8, 5, 4, 7, 10, 11, 12, 13, 6, 1, 14, 9}
{2, 3, 10, 5, 4, 7, 8, 11, 12, 13, 14, 1, 6, 9}
{2, 3, 10, 5, 12, 4, 11, 6, 13, 8, 1, 14, 9}
{8, 3, 2, 5, 10, 7, 6, 11, 4, 13, 14, 1, 12, 9}
{8, 3, 2, 5, 10, 7, 6, 11, 12, 13, 14, 1, 4, 9}
{2, 3, 12, 5, 4, 9, 6, 7, 14, 1, 8, 13, 10, 11}
{2, 3, 12, 5, 8, 9, 14, 7, 6, 1, 4, 13, 10, 11}
{2, 3, 8, 5, 6, 9, 10, 11, 14, 1, 4, 13, 12, 7}
{2, 3, 8, 5, 14, 9, 6, 11, 4, 1, 12, 13, 10, 7}
{8, 3, 2, 5, 14, 9, 6, 11, 12, 1, 4, 13, 10, 7}
{2, 3, 10, 7, 4, 5, 14, 1, 6, 11, 8, 13, 12, 9}
{2, 3, 10, 7, 12, 5, 6, 1, 14, 11, 8, 13, 4, 9}
{2, 3, 10, 7, 14, 5, 4, 1, 8, 11, 6, 13, 12, 9}
16 strings
{2, 3, 10, 5, 16, 7, 6, 9, 14, 11, 8, 15, 12, 13, 4, 1}
{2, 3, 12, 5, 14, 7, 16, 9, 6, 11, 10, 15, 8, 13, 4, 1}
{2, 3, 12, 5, 10, 7, 8, 9, 16, 13, 6, 11, 4, 1, 14, 15}
{2, 3, 12, 5, 10, 7, 16, 9, 6, 13, 8, 11, 4, 1, 14, 15}
{6, 3, 10, 5, 2, 7, 12, 9, 16, 13, 4, 11, 8, 1, 14, 15}
{6, 3, 10, 5, 12, 7, 16, 9, 4, 13, 2, 11, 8, 1, 14, 15}
{6, 3, 12, 5, 2, 7, 16, 9, 4, 13, 14, 11, 8, 1, 10, 15}
{2, 3, 10, 5, 12, 7, 8, 9, 16, 13, 14, 15, 4, 1, 6, 11}
{2, 3, 12, 5, 4, 7, 8, 9, 16, 13, 6, 15, 10, 1, 14, 11}
{2, 3, 12, 5, 10, 7, 8, 9, 16, 13, 14, 15, 4, 1, 6, 11}
{2, 3, 12, 5, 10, 7, 8, 9, 16, 13, 14, 15, 6, 1, 4, 11}
{2, 3, 10, 5, 10, 7, 16, 9, 6, 13, 8, 15, 4, 1, 14, 11}
{2, 3, 10, 5, 14, 7, 8, 11, 6, 9, 16, 1, 12, 15, 4, 13}
{6, 3, 14, 5, 2, 7, 10, 11, 12, 9, 16, 1, 8, 15, 4, 13}
{8, 3, 14, 5, 12, 9, 4, 7, 16, 1, 10, 11, 2, 15, 6, 13}

{8, 3, 14, 5, 12, 9, 10, 7, 16, 1, 4, 11, 6, 15, 2, 13}
{2, 3, 12, 5, 16, 9, 4, 7, 8, 1, 10, 13, 6, 15, 14, 11}
{2, 3, 8, 5, 16, 9, 14, 11, 4, 1, 12, 13, 10, 15, 6, 7}
{2, 3, 10, 5, 8, 9, 6, 11, 16, 1, 4, 13, 14, 15, 12, 7}
{6, 3, 2, 7, 12, 5, 14, 1, 4, 9, 16, 13, 8, 15, 10, 11}
{6, 3, 12, 7, 4, 5, 16, 1, 14, 9, 10, 13, 2, 15, 8, 11}
{2, 3, 6, 7, 8, 9, 12, 1, 16, 5, 10, 13, 14, 15, 4, 11}
{6, 3, 12, 7, 14, 9, 16, 1, 4, 5, 10, 13, 2, 15, 8, 11}

Figure 3:
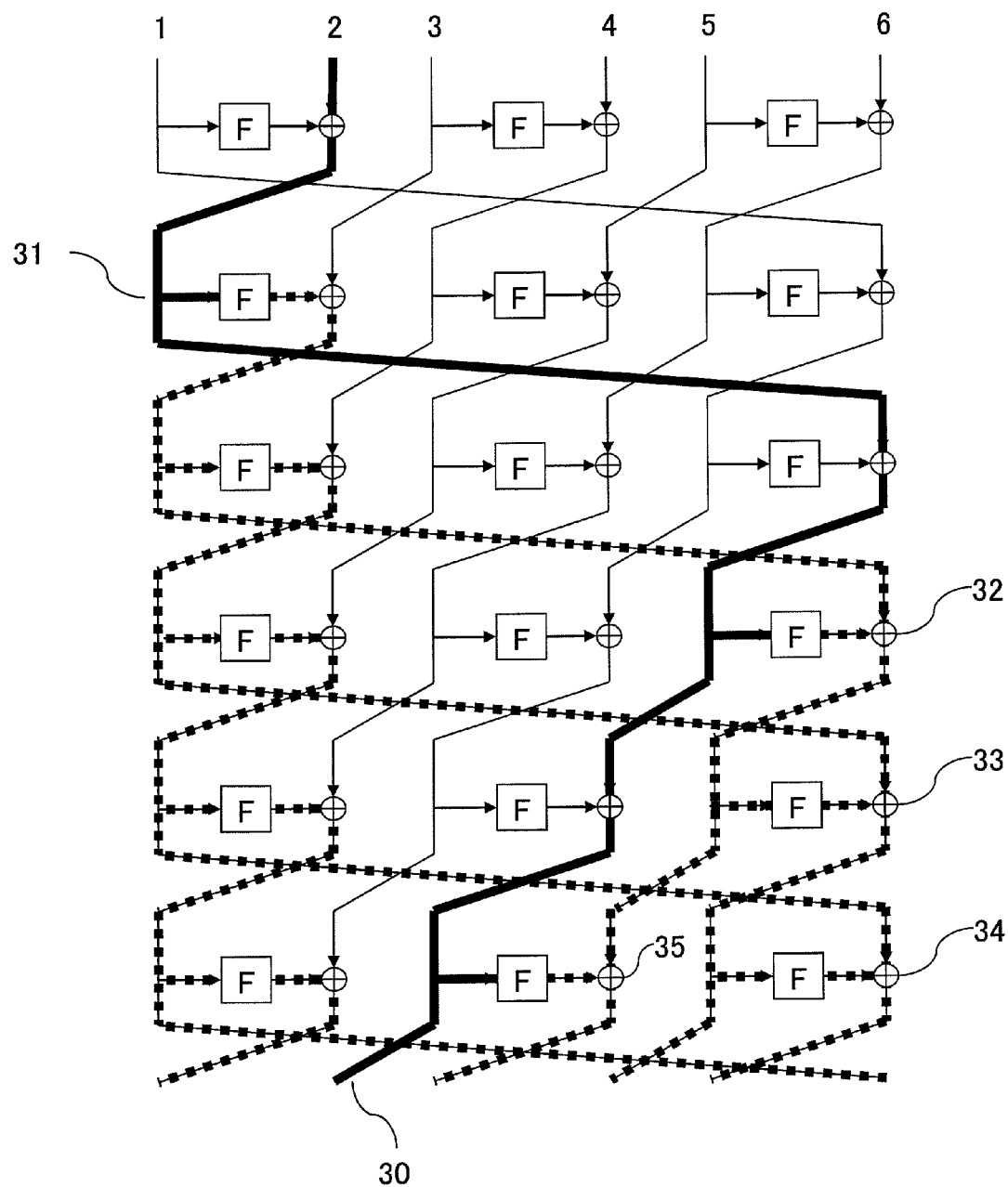
FIG. 3 shows an example of differential spreading in a 6-string generalized Feistel structure.
Figure 4:
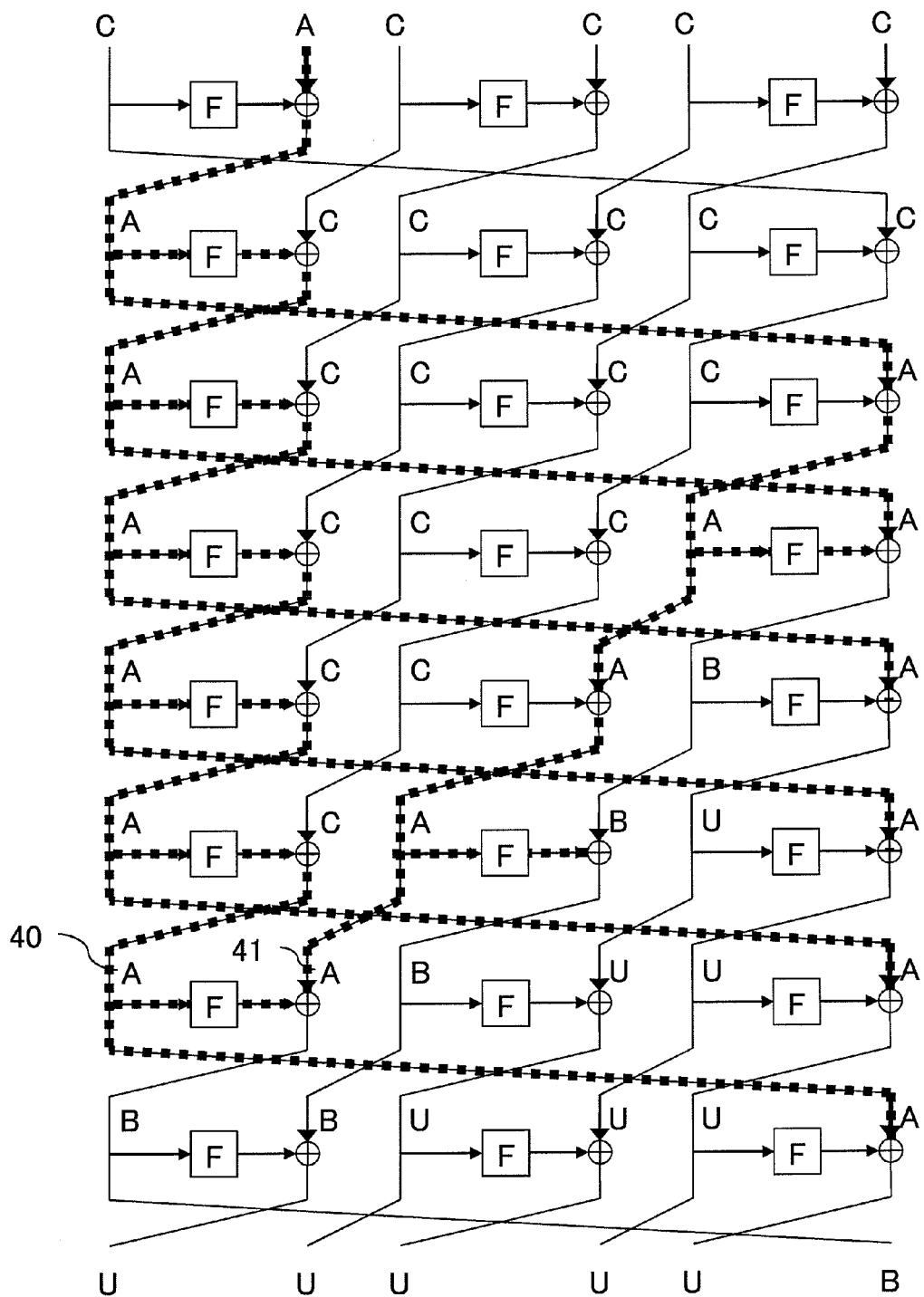
FIG. 4 shows an example of propagation of a saturation characteristic in the 6-string generalized Feistel structure.
Figure 5:
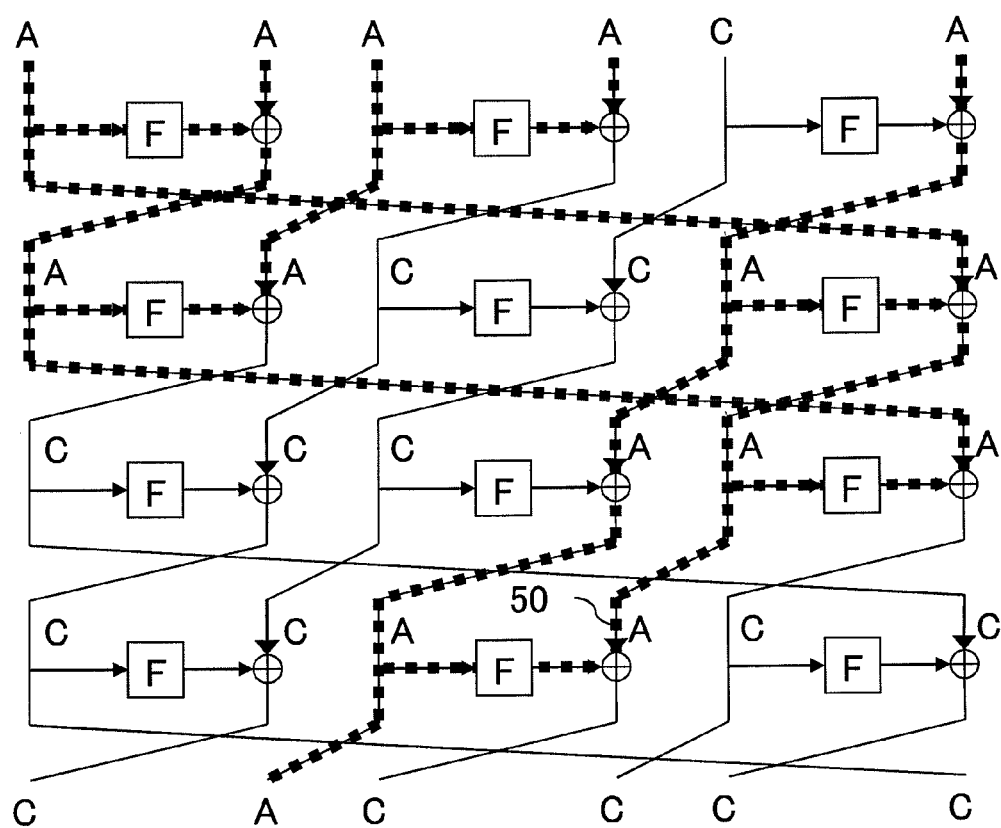
FIG. 5 shows extension towards the plaintext side of the saturation characteristic of the 6-string generalized Feistel structure.
Figure 11:
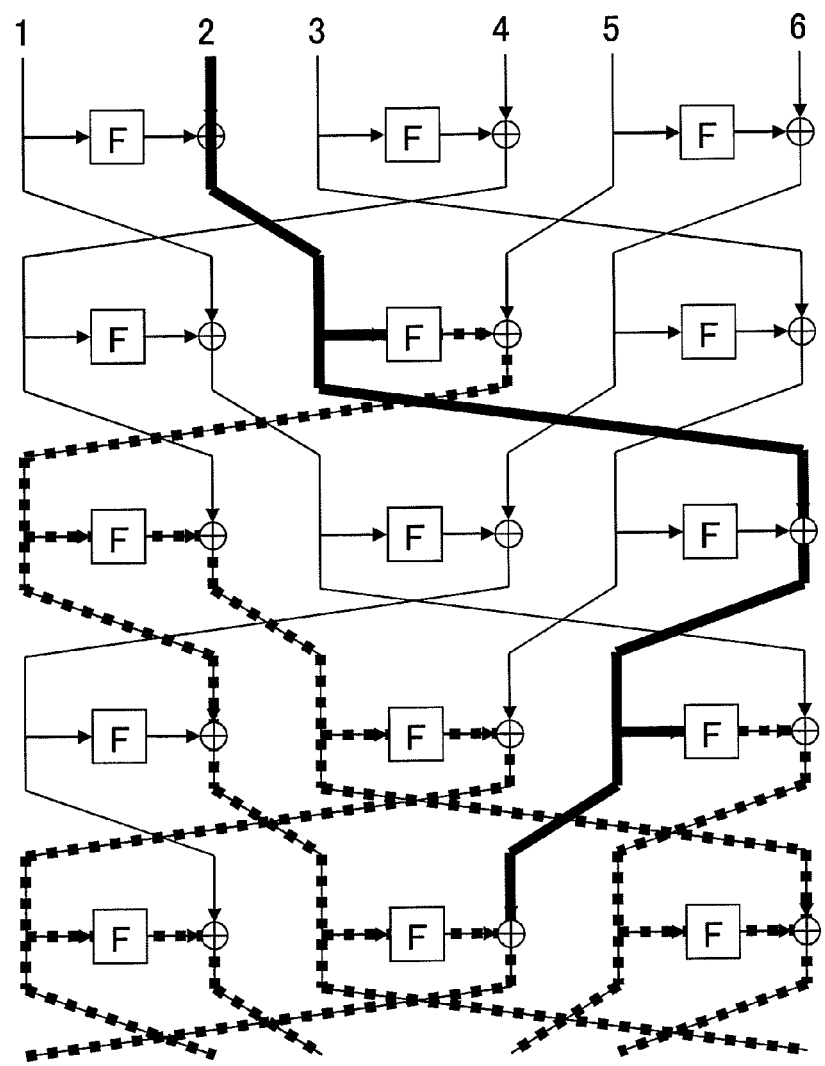
FIG. 11 shows the manner of data spreading in the encryption device (6-string) according to the first exemplary embodiment.

The meritorious effect of the present exemplary embodiment will now be explained with reference to the drawings. FIG. 11 shows how data propagates in the encryption device shown in FIG. 9. The data of the string 2 propagates over the entire strings at the round 5, and hence the number of times of the processing of permutation is less by one round than that in case the processing of permutation is the cyclic shift. In case the processing of permutation is the cyclic shift, first collision occurs at the round 4, as shown in FIG. 3. In the processing of permutation of the encryption device of the present exemplary embodiment, no collision occurs in the round 4, but the data is spread to a string where data has not become spread. As a result, data propagates to the entire strings at the round 5.

Figure 6:
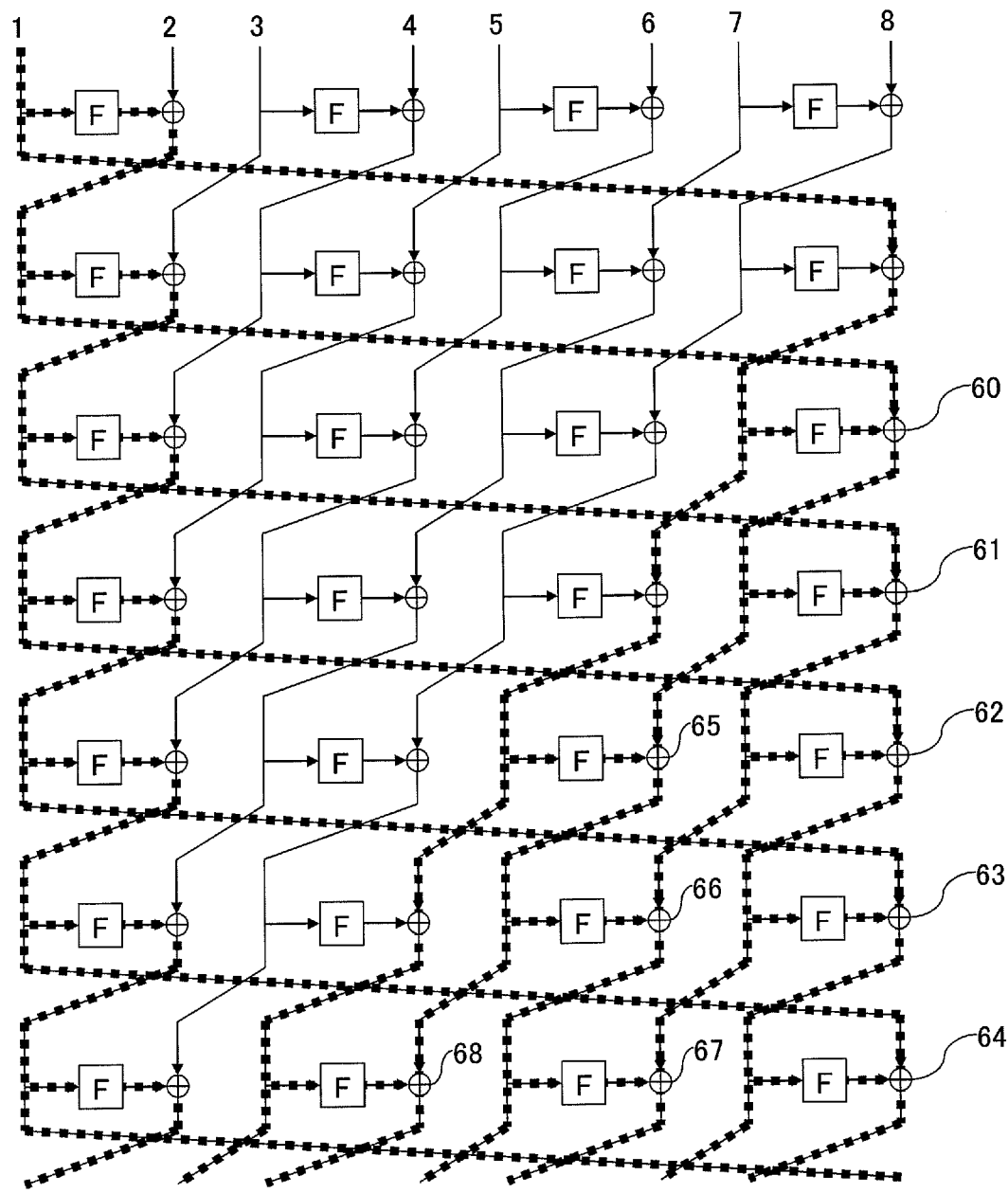
FIG. 6 shows the manner of spreading of data of an 8-string generalized Feistel structure.

FIG. 12 shows, in a tabulated form, how many rounds are needed for data to propagate to the entire strings in case the above described permutation means are used. As may be seen from FIG. 3 or 6, k rounds are needed until propagation to the entire strings in case the processing of permutation is cyclic shift. Thus, by using the permutation unit 81 of the encryption device 10 of the present exemplary embodiment, the number of the rounds until propagation to the entire strings may be reduced. Moreover, the larger the number of division k, the higher becomes the reducing effect. On the other hand, the number of impossible differential characteristic rounds and that of the saturation characteristic rounds are about twice the number of rounds needed for spreading. It is thus possible to reduce the number of rounds to an appreciably smaller value than that of characteristic rounds in the method shown in FIG. 3.

As a beneficent result of the encryption device of the present exemplary embodiment, it is possible to improve the proofness against impossible differential or saturation attack, as the size of the encryption device 10 is substantially maintained, thereby improving its processing performance. Moreover, the processing of permutation in the permutation unit 19 is simply interchanging of bit data, and hence the size of implementation is not increased by changes in the permutation pattern irrespectively of whether the implementation system is that of hardware or that of software.

Second Exemplary Embodiment

Figure 13:
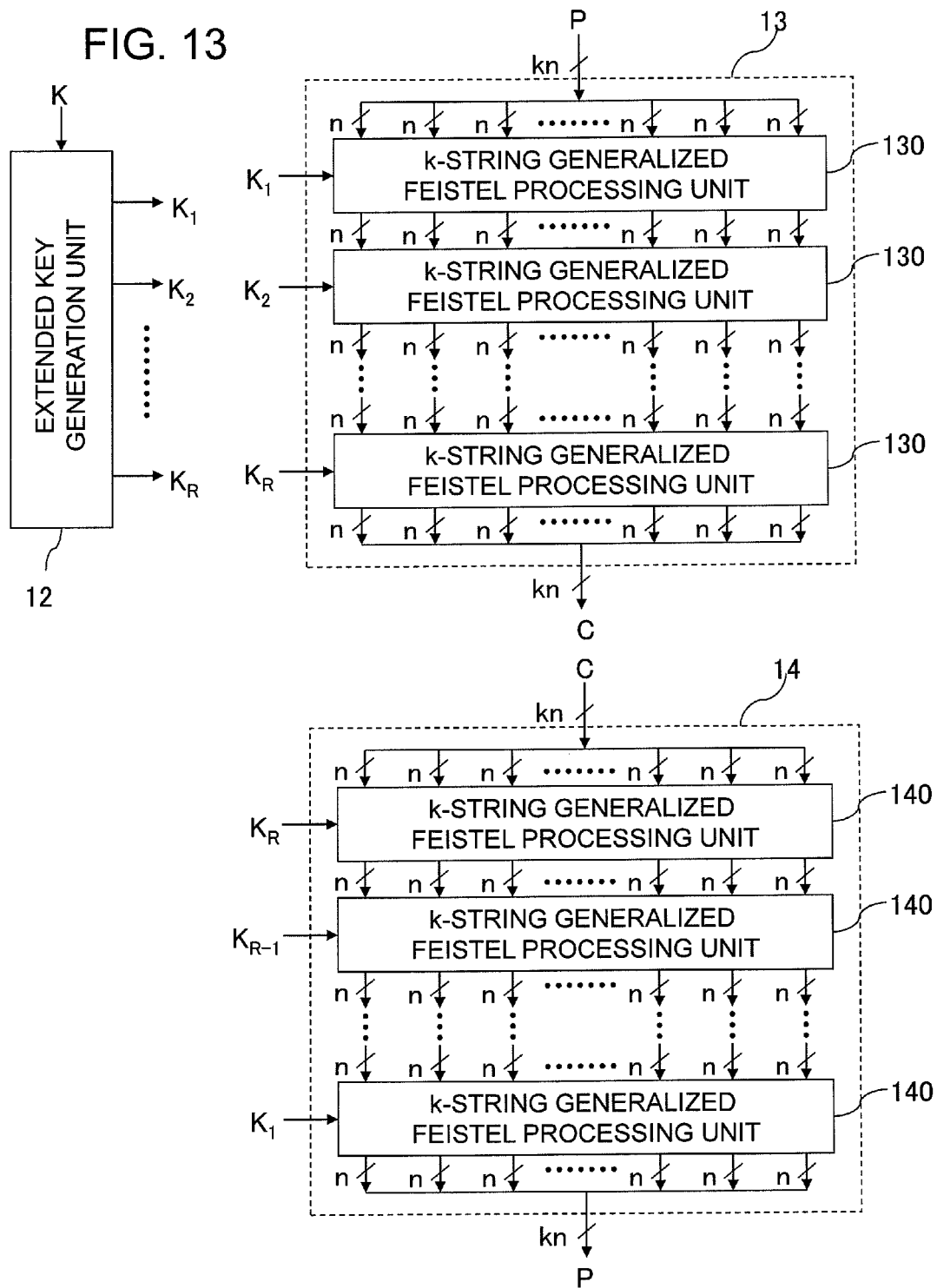
FIG. 13 is a block diagram showing the configuration of an encryption device according to a second exemplary embodiment.

An encryption device according to a second exemplary embodiment will now be described with reference to the drawings. FIG. 13 depicts a block diagram showing an arrangement of an encryption device of the present exemplary embodiment. Referring to FIG. 13, the encryption device includes an extended key generation unit 12, an encryption unit 13 and a decryption unit 14.

The extended key generation unit 12 generates a plurality of extended keys $K_1, K_2, \ldots, K_R$ from key data K to deliver the extended keys $K_1, K_2, \ldots, K_R$ to the encryption unit 13 and to the decryption unit 14. The encryption unit 13 receives one-block plaintext data P and the extended keys $K_1, K_2, \ldots, K_R$ to generate one-block ciphertext data C. The decryption unit 14 receives one-block ciphertext data C and the extended keys $K_1, K_2, \ldots, K_R$ to generate the one-block plaintext data P.

The encryption unit 13 includes an R-number of k-string generalized Feistel processing units 130, where k is an even number not less than 6. Initially, kn-bit plaintext data P is divided into a k-number of n-bit data and delivered along with the key data $K_1$ to the k-string generalized Feistel processing units 130 where data is mashed and data resulting from mashing is output. An output of the k-string generalized Feistel processing units 130 of the round (r−1) and key data $K_r$ are delivered to a round r (2≤r≤R). The data and the extended keys are repeatedly mashed, so that kn-bit data, obtained on concatenating a k-number of outputs from the k-string generalized Feistel processing units 130 of the round R, is output as the ciphertext data C.

The decryption unit 14 has an R-number of k-string generalized Feistel processing units 140. The kn-bit ciphertext data C is divided into a k-number of n-bit data which are delivered along with the key data $K_R$ to the k-string generalized Feistel processing units 140 where data are mashed and data resulting from mashing are output. An output of the k-string generalized Feistel processing unit 140 of a round (r−1) and key data $K_r'$ are delivered to a round r (2≤r≤R), so that the data and the extended keys are repeatedly mashed. The k-number of outputs from the k-string generalized Feistel processing unit 140 of the round R are concatenated to give kn-bit data which is output as plaintext data P. It is noted that the use sequence of the extended keys in the decryption unit 14 is the reverse of that in the encryption unit 13, as shown in FIG. 13.

Figure 14:
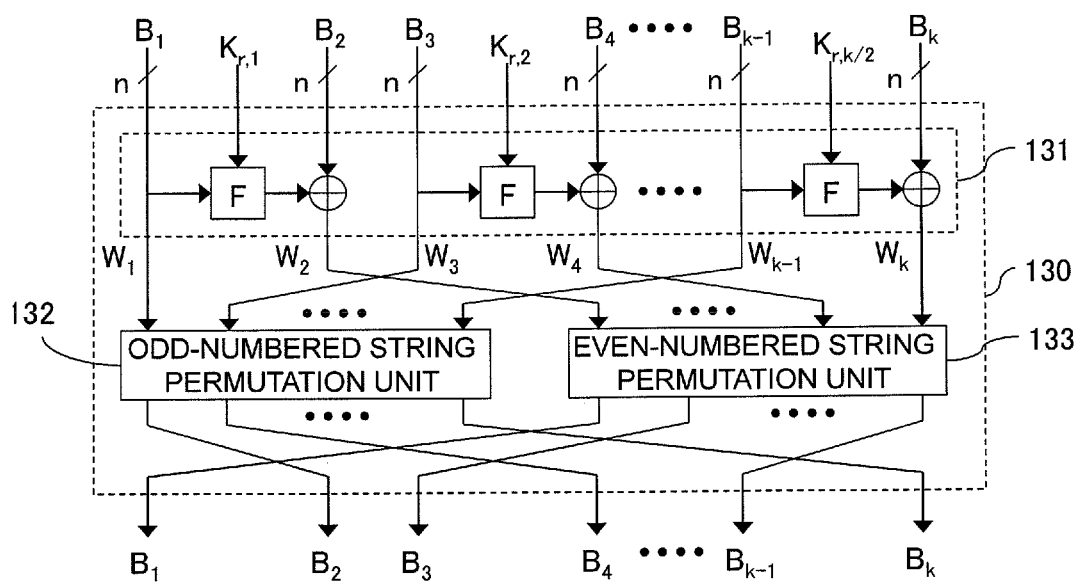
FIG. 14 is a block diagram showing the configuration of a k-string generalized Feistel processing unit in an encryption unit according to the second exemplary embodiment.

FIG. 14 depicts a block diagram showing an arrangement of the k-string generalized Feistel processing units 130 in the encryption unit 13 of the encryption device in the present exemplary embodiment. Referring to FIG. 14, the k-string generalized Feistel processing unit 130 includes a non-linear transforming unit 131, an odd-numbered string permutation unit 132 and an even-numbered string permutation unit 133.

The non-linear transforming unit 131 has a k/2-number of the F-functions. Out of a k-number of input data $B_1, B_2, \ldots, B_k$, $B_i$, where i is an odd number not larger than k, are delivered to the F-functions. The F-functions perform non-linear transformation processing, such as S-box processing, used in a routine encryption algorithm. The extended key data $K_i$ are equally divided into a k/2-number of data each of which is delivered to the F-function so as to be mashed with the input data $B_i$. Each of a k/2 number of n-bit data output from the F-functions is XORed with the input data $B_j$, where j is an even number not larger than k, to give intermediate data $W_j$. The input data $B_i$ also is to be directly the intermediate data $W_i$.

The odd-numbered string permutation unit 132 permutes odd-numbered string data out of the k-number of the intermediate data to deliver an output of even-numbered string data out of output data of the k-string generalized Feistel processing unit 130. The even-numbered string permutation unit 133 permutes even-numbered string data out of the k-number of the intermediate data to deliver an output of odd-numbered string data out of the output data of the k-string generalized Feistel processing units 130. Preferably, an optimum one of the relations of correspondence between the input string and the output string in these permutation units is to be selected and applied in dependence upon the number of division k.

Figure 15:
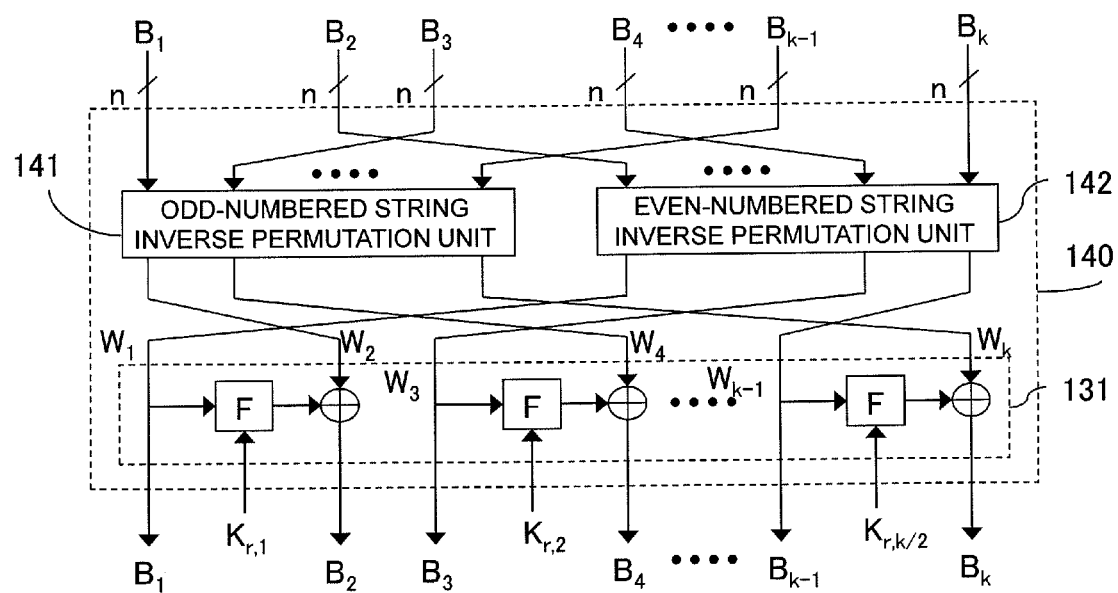
FIG. 15 is a block diagram showing the configuration of a k-string generalized Feistel processing unit in a decryption unit of the encryption device according to the second exemplary embodiment.

FIG. 15 depicts a block diagram showing an arrangement of the k-string generalized Feistel processing units 140 in the decryption unit 14 of the encryption device according to the present exemplary embodiment. Referring to FIG. 15, the k-string generalized Feistel processing unit 140 includes an odd-numbered string inverse permutation unit 141, an even-numbered string inverse permutation unit 142 and a non-linear transforming unit 131.

The odd-numbered string inverse permutation unit 141 permutes the odd-numbered string data, out of input data to the k-string generalized Feistel processing unit 140, to deliver an output of even-numbered string data out of the input data to the k-string generalized Feistel processing unit 140. The input/output relation in the processing of permutation of the odd-numbered string inverse permutation unit 141 is reversed from that of the even-numbered string permutation unit 133.

The even-numbered string inverse permutation unit 142 permutes even-numbered string data, out of the input data to the k-string generalized Feistel processing unit 140, to deliver an output of odd-numbered string data out of the input data to the k-string generalized Feistel processing unit 140. The input/output relation in the processing of permutation of the even-numbered string inverse permutation unit 142 is the reverse of that of the odd-numbered string permutation unit 132.

Figure 16:
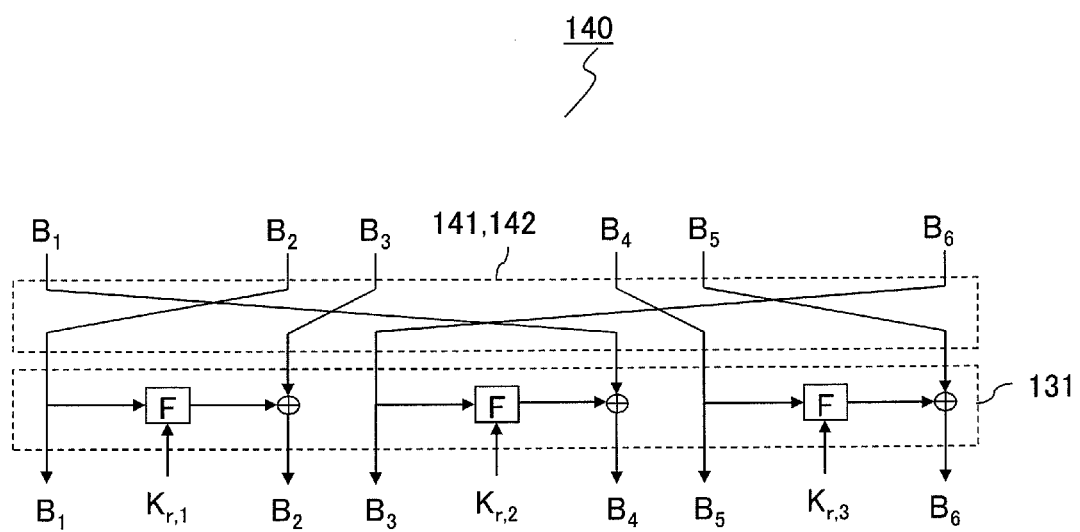
FIG. 16 is a block diagram showing the configuration of a 6-string generalized Feistel processing unit in a decryption unit of the encryption device according to the second exemplary embodiment.

If the permutation unit 81 of the 6-string generalized Feistel structure, shown in FIG. 9, is separately considered in terms of odd-numbered strings and even-numbered strings, the odd-numbered string permutation unit 132 may be expressed as {2, 4, 6} and the even-numbered string permutation unit 133 as {3, 1, 5}. The odd-numbered string inverse permutation unit 141 may be expressed as {4, 2, 6} and the even-numbered string inverse permutation unit 142 as {1, 5, 3}. FIG. 16 shows an arrangement of the k-string generalized Feistel processing units 140 (k=6) in the decryption unit 14 for such case.

Third Exemplary Embodiment

Figure 17:
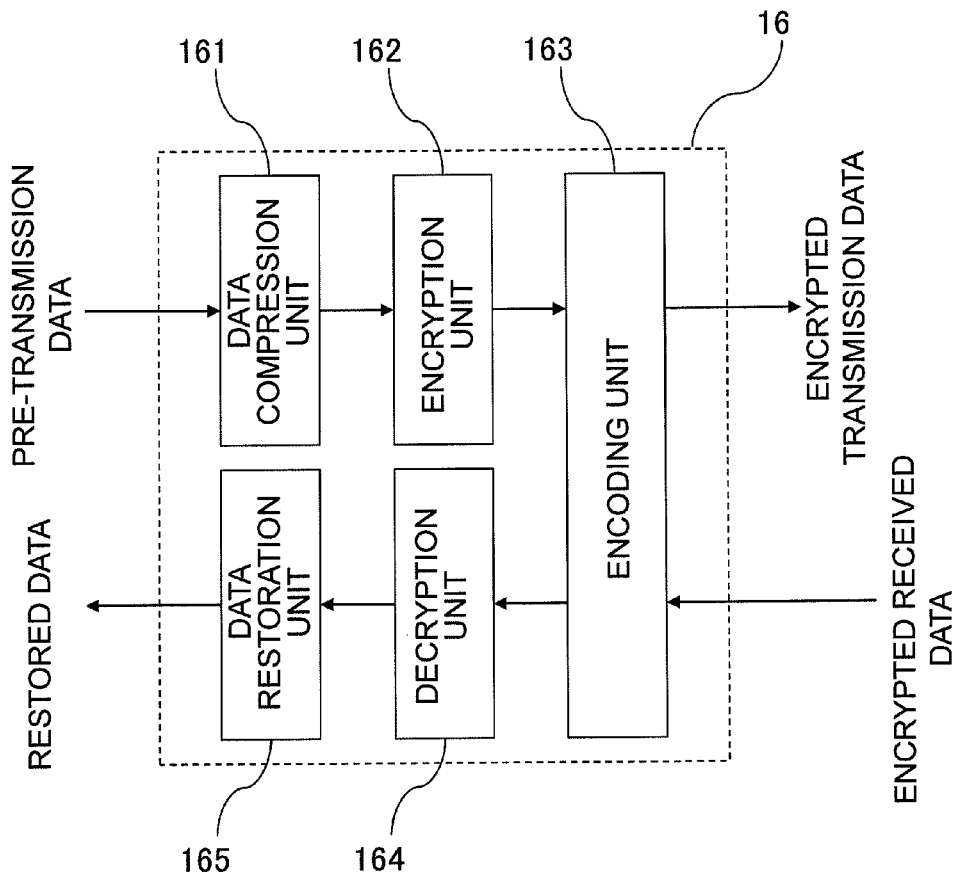
FIG. 17 is a block diagram showing the configuration of a communication device according to a third exemplary embodiment.

A communication device according to a third exemplary embodiment will now be described with reference to the drawings. The encryption device of the above described exemplary embodiment may be used as a data processor to hide communication data. FIG. 17 depicts a block diagram showing an arrangement of a communication device 16 according to the present exemplary embodiment. Referring to FIG. 17, the communication device 16 includes a data compression unit 161, an encryption unit 162, an encoding unit 163, a decryption unit 164 and a data restoration unit 165.

In transmitting data, the data compression unit 161 compresses pre-transmission data. The encryption unit 162 then encrypts the compressed data. As the encryption unit 162, the encryption device of the first or second exemplary embodiment may be used. Finally, the encoding unit 163 encodes encrypted data for error correction to transmit resulting data as encrypted transmission data.

In receiving data, the encoding unit 163 corrects the received encrypted data for errors. The decryption unit 164 decrypts the data corrected for errors. Finally, the data restoration unit 165 decompresses the data to find restored data.

It is noted that the encryption device of the first to third exemplary embodiments may be implemented as a program running on a computer or as hardware such as LSI (Large Scale Integration). The program may also be offered recorded on a computer-readable recording medium.

Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept.

EXPLANATION OF SYMBOLS 10 encryption device
12 extended key generation unit
13 encryption unit
14 decryption unit
16 communication device
18, 20, 80, 131 non-linear transformation unit
19, 21, 81, 90 permutation unit
30 data
31 branching
32-35, 60-68 XOR (exclusive-OR)
40, 41 total number data
130, 140 k-string generalized Feistel processing unit
132 odd-numbered string permutation unit
133 even-numbered string permutation unit
141 odd-numbered string inverse permutation unit
142 even-numbered string inverse permutation unit
161 data compression unit
162 encryption unit
163 encoding unit
164 decryption unit
165 data restoration unit

What is claimed:

1. An information processing device, comprising:
a non-linear transformation unit that takes a k/2-number of odd-numbered string data $B_i$ (i=1, 3, . . . , k−1), k being an even number not smaller than 6, out of a k-number of string data $\{B_1, B_2, \ldots, B_k\}$, as intermediate data $W_i$, and that XORs data transformed from the odd-numbered string data $B_i$ based on a bijective F-function, in which an as-transformed value is determined responsive to a value of key data, and even-numbered string data $B_{i+1}$, to give intermediate data $W_{i+1}$;
a plurality of k-string generalized Feistel processing units, each of which includes the non-linear transformation unit; and
an encryption unit that includes a plurality of k-string generalized Feistel processing units, each of which includes the non-linear transformation unit,
wherein the encryption unit inputs, at said k-string generalized Feistel processing units, a plurality of extended keys generated from key data and plaintext data to encrypt the plaintext data; and
wherein the intermediate data $W_x$ (x=1, 2, . . . , k) with $B_{p[x]}$, a permutation being expressed by $\pi_k=\{p[0], p[1], \ldots, p[k]\}$, wherein
if the k strings are six strings,
$\pi_6=\{2, 3, 6, 1, 4, 5\}$;
if the k strings are eight strings,
$\pi_8=\{2, 3, 6, 7, 8, 5, 4, 1\}$,
$\pi_8=\{4, 5, 2, 3, 8, 1, 6, 7\}$, or
$\pi_8=\{2, 5, 4, 7, 8, 1, 6, 3\}$;
if the k strings are ten strings,
$\pi_{10}=\{2, 3, 10, 5, 4, 9, 6, 7, 8, 1\}$,
$\pi_{10}=\{2, 3, 10, 5, 8, 9, 4, 7, 6, 1\}$,
$\pi_{10}=\{6, 3, 2, 7, 4, 5, 10, 1, 8, 9\}$,
$\pi_{10}=\{2, 3, 6, 7, 8, 9, 4, 1, 10, 5\}$, or
$\pi_{10}=\{2, 5, 8, 3, 10, 1, 4, 9, 6, 7\}$;

if the k strings are 12 strings,
$\pi_{12}$={2, 3, 4, 5, 8, 1, 10, 11, 6, 7, 12, 9},
$\pi_{12}$={2, 3, 4, 5, 8, 9, 10, 11, 6, 1, 12, 7},
$\pi_{12}$={2, 3, 6, 1, 4, 7, 10, 5, 8, 11, 12, 9},
$\pi_{12}$={2, 3, 6, 1, 4, 7, 10, 11, 12, 9, 8, 5},
$\pi_{12}$={2, 3, 6, 1, 8, 9, 4, 5, 12, 7, 10, 11},
$\pi_{12}$={2, 3, 6, 1, 8, 9, 4, 11, 10, 7, 12, 5},
$\pi_{12}$={2, 3, 6, 1, 8, 9, 10, 5, 4, 11, 12, 7},
$\pi_{12}$={2, 3, 6, 1, 8, 9, 10, 11, 4, 7, 12, 5},
$\pi_{12}$={2, 3, 6, 7, 4, 9, 10, 11, 12, 1, 8, 5},
$\pi_{12}$={2, 3, 6, 7, 4, 9, 12, 1, 8, 5, 10, 11},
$\pi_{12}$={2, 3, 6, 7, 4, 9, 12, 5, 8, 11, 10, 1},
$\pi_{12}$={2, 3, 6, 7, 8, 1, 10, 11, 4, 5, 12, 9},
$\pi_{12}$={2, 3, 6, 7, 8, 1, 10, 11, 12, 5, 4, 9},
$\pi_{12}$={2, 3, 6, 7, 8, 5, 10, 11, 4, 1, 12, 9},
$\pi_{12}$={2, 3, 6, 7, 8, 5, 10, 11, 12, 1, 4, 9},
$\pi_{12}$={2, 3, 6, 7, 8, 5, 10, 11, 12, 9, 4, 1},
$\pi_{12}$={2, 3, 6, 7, 8, 9, 4, 1, 12, 5, 10, 11},
$\pi_{12}$={2, 3, 6, 7, 8, 9, 4, 11, 12, 1, 10, 5},
$\pi_{12}$={2, 3, 6, 7, 8, 9, 10, 5, 12, 1, 4, 11},
$\pi_{12}$={2, 3, 6, 7, 8, 9, 10, 11, 12, 5, 4, 11},
$\pi_{12}$={2, 3, 6, 7, 8, 9, 12, 1, 4, 11, 10, 5},
$\pi_{12}$={2, 3, 6, 7, 8, 9, 12, 5, 4, 1, 10, 11},
$\pi_{12}$={2, 3, 6, 7, 8, 9, 12, 5, 10, 11, 4, 1},
$\pi_{12}$={2, 3, 6, 7, 10, 1, 4, 9, 12, 5, 8, 11},
$\pi_{12}$={2, 3, 6, 7, 10, 1, 4, 11, 12, 9, 8, 5},
$\pi_{12}$={2, 3, 6, 7, 10, 1, 12, 9, 8, 5, 4, 11},
$\pi_{12}$={2, 3, 6, 7, 10, 1, 12, 9, 8, 11, 4, 5},
$\pi_{12}$={2, 3, 6, 7, 10, 5, 12, 9, 8, 11, 4, 1},
$\pi_{12}$={2, 3, 6, 7, 10, 11, 4, 5, 8, 1, 12, 9},
$\pi_{12}$={2, 3, 6, 7, 10, 11, 4, 5, 12, 9, 8, 1},
$\pi_{12}$={2, 3, 6, 7, 10, 11, 4, 9, 12, 1, 8, 5},
$\pi_{12}$={2, 3, 6, 7, 10, 11, 8, 9, 12, 1, 4, 5},
$\pi_{12}$={2, 3, 6, 7, 10, 11, 12, 1, 4, 9, 8, 5},
$\pi_{12}$={2, 3, 6, 7, 10, 11, 12, 9, 4, 1, 8, 5},
$\pi_{12}$={2, 3, 6, 7, 10, 11, 12, 9, 4, 5, 8, 1},
$\pi_{12}$={2, 3, 6, 7, 10, 11, 12, 9, 8, 1, 4, 5},
$\pi_{12}$={2, 3, 6, 7, 10, 11, 12, 9, 8, 5, 4, 1},
$\pi_{12}$={4, 1, 2, 5, 8, 3, 6, 9, 12, 7, 10, 11},
$\pi_{12}$={4, 1, 2, 5, 8, 9, 10, 3, 12, 7, 6, 11},
$\pi_{12}$={4, 1, 2, 5, 8, 9, 10, 7, 12, 3, 6, 11},
$\pi_{12}$={4, 1, 2, 5, 8, 9, 12, 3, 6, 7, 10, 11},
$\pi_{12}$={4, 1, 2, 5, 8, 9, 12, 7, 6, 3, 10, 11},
$\pi_{12}$={4, 1, 6, 3, 2, 7, 10, 11, 12, 9, 8, 5},
$\pi_{12}$={4, 1, 6, 7, 2, 9, 12, 5, 8, 11, 10, 3},
$\pi_{12}$={4, 1, 6, 7, 8, 3, 10, 11, 12, 9, 2, 5},
$\pi_{12}$={4, 1, 6, 7, 8, 5, 10, 11, 12, 3, 2, 9},
$\pi_{12}$={4, 1, 6, 7, 8, 9, 12, 3, 2, 11, 10, 5},
$\pi_{12}$={4, 1, 6, 7, 10, 3, 12, 5, 8, 11, 2, 9},
$\pi_{12}$={4, 1, 6, 7, 10, 3, 12, 9, 2, 11, 8, 5},
$\pi_{12}$={4, 1, 6, 7, 10, 5, 12, 9, 2, 11, 8, 3},
$\pi_{12}$={4, 1, 6, 7, 10, 11, 2, 5, 12, 3, 8, 9},
$\pi_{12}$={4, 1, 6, 7, 10, 11, 2, 5, 12, 9, 8, 3},
$\pi_{12}$={4, 1, 6, 7, 10, 11, 2, 9, 12, 5, 8, 3},
$\pi_{12}$={4, 1, 6, 7, 10, 11, 12, 3, 8, 5, 2, 9},
$\pi_{12}$={4, 1, 6, 7, 10, 11, 12, 5, 2, 3, 8, 9},
$\pi_{12}$={4, 1, 6, 7, 10, 11, 12, 9, 2, 3, 8, 5},
$\pi_{12}$={4, 1, 6, 7, 10, 11, 12, 9, 2, 5, 8, 3},
$\pi_{12}$={4, 1, 6, 7, 10, 11, 12, 9, 8, 3, 2, 5}, or
$\pi_{12}$={4, 1, 6, 7, 10, 11, 12, 9, 8, 5, 2, 3};
if the k strings are 14 strings,
$\pi_{14}$={2, 3, 10, 5, 4, 7, 14, 9, 8, 11, 12, 13, 6, 1},
$\pi_{14}$={2, 3, 10, 5, 14, 7, 8, 9, 6, 11, 4, 13, 12, 1},
$\pi_{14}$={2, 3, 12, 5, 4, 7, 14, 9, 10, 11, 8, 13, 6, 1},
$\pi_{14}$={6, 3, 2, 5, 12, 7, 4, 9, 14, 11, 10, 13, 8, 1},
$\pi_{14}$={6, 3, 10, 5, 2, 7, 14, 9, 8, 11, 4, 13, 12, 1},
$\pi_{14}$={6, 3, 10, 5, 4, 7, 2, 9, 14, 11, 8, 13, 12, 1},
$\pi_{14}$={6, 3, 14, 5, 12, 7, 4, 9, 2, 11, 10, 13, 8, 1},
$\pi_{14}$={2, 3, 8, 5, 4, 7, 14, 9, 6, 13, 10, 11, 12, 1},
$\pi_{14}$={2, 3, 8, 5, 6, 7, 12, 9, 4, 13, 14, 11, 10, 1},
$\pi_{14}$={2, 3, 8, 5, 12, 7, 14, 9, 6, 13, 4, 11, 10, 1},
$\pi_{14}$={2, 3, 10, 5, 4, 7, 8, 9, 12, 13, 14, 11, 6, 1},
$\pi_{14}$={2, 3, 10, 5, 6, 7, 12, 9, 8, 13, 14, 11, 4, 1},
$\pi_{14}$={2, 3, 10, 5, 12, 7, 8, 9, 6, 13, 14, 11, 4, 1},
$\pi_{14}$={2, 3, 12, 5, 10, 7, 4, 9, 8, 13, 14, 11, 6, 1},
$\pi_{14}$={2, 3, 12, 5, 10, 7, 6, 9, 4, 13, 14, 11, 8, 1},
$\pi_{14}$={2, 3, 12, 5, 14, 7, 8, 9, 6, 13, 10, 11, 4, 1},
$\pi_{14}$={2, 3, 14, 5, 10, 7, 6, 9, 4, 13, 8, 11, 12, 1},
$\pi_{14}$={2, 3, 14, 5, 10, 7, 12, 9, 8, 13, 4, 11, 6, 1},
$\pi_{14}$={2, 3, 8, 5, 10, 7, 14, 11, 4, 9, 6, 1, 12, 13},
$\pi_{14}$={2, 3, 10, 5, 4, 7, 14, 11, 8, 9, 6, 1, 12, 13}
$\pi_{14}$={2, 3, 10, 5, 12, 7, 4, 11, 6, 9, 14, 1, 8, 13},
$\pi_{14}$={2, 3, 10, 5, 14, 7, 4, 11, 6, 9, 8, 1, 12, 13},
$\pi_{14}$={2, 3, 10, 5, 14, 7, 6, 11, 8, 9, 4, 1, 12, 13},
$\pi_{14}$={6, 3, 2, 5, 12, 7, 10, 11, 8, 9, 14, 1, 4, 13},
$\pi_{14}$={6, 3, 10, 5, 2, 7, 14, 11, 12, 9, 8, 1, 4, 13},
$\pi_{14}$={6, 3, 10, 5, 4, 7, 2, 11, 8, 9, 14, 1, 12, 13},
$\pi_{14}$={6, 3, 10, 5, 12, 7, 4, 11, 8, 9, 14, 1, 2, 13},
$\pi_{14}$={6, 3, 10, 5, 14, 7, 4, 11, 2, 9, 8, 1, 12, 13},
$\pi_{14}$={6, 3, 12, 5, 10, 7, 14, 11, 4, 9, 8, 1, 2, 13},
$\pi_{14}$={8, 3, 2, 5, 10, 7, 4, 11, 12, 9, 14, 1, 6, 13},
$\pi_{14}$={8, 3, 2, 5, 10, 7, 6, 11, 12, 9, 14, 1, 4, 13},
$\pi_{14}$={2, 3, 8, 5, 4, 7, 10, 11, 12, 13, 6, 1, 14, 9},
$\pi_{14}$={2, 3, 10, 5, 4, 7, 8, 11, 12, 13, 14, 1, 6, 9},
$\pi_{14}$={2, 3, 10, 5, 12, 7, 4, 11, 6, 13, 8, 1, 14, 9},
$\pi_{14}$={8, 3, 2, 5, 10, 7, 6, 11, 4, 13, 14, 1, 12, 9},
$\pi_{14}$={8, 3, 2, 5, 10, 7, 6, 11, 12, 13, 14, 1, 4, 9},
$\pi_{14}$={2, 3, 12, 5, 4, 9, 6, 7, 14, 1, 8, 13, 10, 11},
$\pi_{14}$={2, 3, 12, 5, 8, 9, 14, 7, 6, 1, 4, 13, 10, 11},
$\pi_{14}$={2, 3, 8, 5, 6, 9, 10, 11, 14, 1, 4, 13, 12, 7},
$\pi_{14}$={2, 3, 8, 5, 14, 9, 6, 11, 4, 1, 12, 13, 10, 7},
$\pi_{14}$={8, 3, 2, 5, 14, 9, 6, 11, 12, 1, 4, 13, 10, 7},
$\pi_{14}$={2, 3, 10, 7, 4, 5, 14, 1, 6, 11, 8, 13, 12, 9},
$\pi_{14}$={2, 3, 10, 7, 12, 5, 6, 1, 14, 11, 8, 13, 4, 9}, or
$\pi_{14}$={2, 3, 10, 7, 14, 5, 4, 1, 8, 11, 6, 13, 12, 9};
if the k strings are 16 strings,
$\pi_{16}$={2, 3, 10, 5, 16, 7, 6, 9, 14, 11, 8, 15, 12, 13, 4, 1},
$\pi_{16}$={2, 3, 12, 5, 14, 7, 16, 9, 6, 11, 10, 15, 8, 13, 4, 1},
$\pi_{16}$={2, 3, 12, 5, 10, 7, 8, 9, 16, 13, 6, 11, 4, 1, 14, 15},
$\pi_{16}$={2, 3, 12, 5, 10, 7, 16, 9, 6, 13, 8, 11, 4, 1, 14, 15},
$\pi_{16}$={6, 3, 10, 5, 2, 7, 12, 9, 16, 13, 4, 11, 8, 1, 14, 15},
$\pi_{16}$={6, 3, 10, 5, 12, 7, 16, 9, 4, 13, 2, 11, 8, 1, 14, 15},
$\pi_{16}$={6, 3, 12, 5, 2, 7, 16, 9, 4, 13, 14, 11, 8, 1, 10, 15},
$\pi_{16}$={2, 3, 10, 5, 12, 7, 8, 9, 16, 13, 14, 15, 4, 1, 6, 11},
$\pi_{16}$={2, 3, 12, 5, 4, 7, 8, 9, 16, 13, 6, 15, 10, 1, 14, 11},
$\pi_{16}$={2, 3, 12, 5, 10, 7, 8, 9, 16, 13, 14, 15, 4, 1, 6, 11},
$\pi_{16}$={2, 3, 12, 5, 10, 7, 8, 9, 16, 13, 14, 15, 6, 1, 4, 11},
$\pi_{16}$={2, 3, 12, 5, 10, 7, 16, 9, 6, 13, 8, 15, 4, 1, 14, 11},
$\pi_{16}$={2, 3, 10, 5, 14, 7, 8, 11, 6, 9, 16, 1, 12, 15, 4, 13},
$\pi_{16}$={6, 3, 14, 5, 2, 7, 10, 11, 12, 9, 16, 1, 8, 15, 4, 13},
$\pi_{16}$={8, 3, 14, 5, 12, 9, 4, 7, 16, 1, 10, 11, 2, 15, 6, 13},
$\pi_{16}$={8, 3, 14, 5, 12, 9, 10, 7, 16, 1, 4, 11, 6, 15, 2, 13},
$\pi_{16}$={2, 3, 12, 5, 16, 9, 4, 7, 8, 1, 10, 13, 6, 15, 14, 11},
$\pi_{16}$={2, 3, 8, 5, 16, 9, 14, 11, 4, 1, 12, 13, 10, 15, 6, 7},
$\pi_{16}$={2, 3, 10, 5, 8, 9, 6, 11, 16, 1, 4, 13, 14, 15, 12, 7},
$\pi_{16}$={6, 3, 2, 7, 12, 5, 14, 1, 4, 9, 16, 13, 8, 15, 10, 11},
$\pi_{16}$={6, 3, 12, 7, 4, 5, 16, 1, 14, 9, 10, 13, 2, 15, 8, 11},
$\pi_{16}$={2, 3, 6, 7, 8, 9, 12, 1, 16, 5, 10, 13, 14, 15, 4, 11}, or
$\pi_{16}$={6, 3, 12, 7, 14, 9, 16, 1, 4, 5, 10, 13, 2, 15, 8, 11}.

2. The information processing device according to claim 1, further comprising
a decryption unit that includes a plurality of k-string generalized Feistel processing units each including the non-linear transformation unit, wherein the decryption unit inputs, at said k-string generalized Feistel processing units, a plurality of the extended keys generated from key data and ciphertext data to decrypt the ciphertext data.

3. The information processing device according to claim 1, further comprising
an extended key generation unit that generates a plurality of the extended keys from the key data.

4. An information processing method, comprising:
taking a k/2-number of odd-numbered string data $B_i$ (i=1, 3, ..., k−1), k being an even number not smaller than 6, out of a k-number of string data $\{B_1, B_2, ..., B_k\}$, as intermediate data $W_i$, and XORing data transformed from the odd-numbered string data $B_i$ based on a bijective F-function, in which an as-transformed value is determined responsive to a value of key data, and even-numbered string data $B_{i+1}$, to give intermediate data $W_{i+1}$;
receiving a plurality of extended keys generated from the key data and plaintext data;
repeating the taking and XORing a plural number of times to encrypt the plaintext data;
receiving a plurality of extended keys generated from the key data and plaintext data; and
repeating the taking and XORing a plural number of times to encrypt the plaintext data;
the intermediate data $W_x$ (x=1, 2, ..., k) with $B_{p[x]}$, a permutation being expressed by $\pi_k=\{p[0], p[1], ..., p[k]\}$, wherein if the k strings are six strings,
$\pi_6=\{2, 3, 6, 1, 4, 5\}$;
if the k strings are eight strings,
$\pi_8=\{2, 3, 6, 7, 8, 5, 4, 1\}$,
$\pi_8=\{4, 5, 2, 3, 8, 1, 6, 7\}$, or
$\pi_8=\{2, 5, 4, 7, 8, 1, 6, 3\}$;
if the k strings are ten strings,
$\pi_{10}=\{2, 3, 10, 5, 4, 9, 6, 7, 8, 1\}$,
$\pi_{10}=\{2, 3, 10, 5, 8, 9, 4, 7, 6, 1\}$,
$\pi_{10}=\{6, 3, 2, 7, 4, 5, 10, 1, 8, 9\}$,
$\pi_{10}=\{2, 3, 6, 7, 8, 9, 4, 1, 10, 5\}$, or
$\pi_{10}=\{2, 5, 8, 3, 10, 1, 4, 9, 6, 7\}$;
if the k strings are 12 strings,
$\pi_{12}=\{2, 3, 4, 5, 8, 1, 10, 11, 6, 7, 12, 9\}$,
$\pi_{12}=\{2, 3, 4, 5, 8, 9, 10, 11, 6, 1, 12, 7\}$,
$\pi_{12}=\{2, 3, 6, 1, 4, 7, 10, 5, 8, 11, 12, 9\}$,
$\pi_{12}=\{2, 3, 6, 1, 4, 7, 10, 11, 12, 9, 8, 5\}$,
$\pi_{12}=\{2, 3, 6, 1, 8, 9, 4, 5, 12, 7, 10, 11\}$,
$\pi_{12}=\{2, 3, 6, 1, 8, 9, 4, 11, 10, 7, 12, 5\}$,
$\pi_{12}=\{2, 3, 6, 1, 8, 9, 10, 5, 4, 11, 12, 7\}$,
$\pi_{12}=\{2, 3, 6, 1, 8, 9, 10, 11, 4, 7, 12, 5\}$,
$\pi_{12}=\{2, 3, 6, 7, 4, 9, 10, 11, 12, 1, 8, 5\}$,
$\pi_{12}=\{2, 3, 6, 7, 4, 9, 12, 1, 8, 5, 10, 11\}$,
$\pi_{12}=\{2, 3, 6, 7, 4, 9, 12, 5, 8, 11, 10, 1\}$,
$\pi_{12}=\{2, 3, 6, 7, 8, 1, 10, 11, 4, 5, 12, 9\}$,
$\pi_{12}=\{2, 3, 6, 7, 8, 1, 10, 11, 12, 5, 4, 9\}$,
$\pi_{12}=\{2, 3, 6, 7, 8, 5, 10, 11, 4, 1, 12, 9\}$,
$\pi_{12}=\{2, 3, 6, 7, 8, 5, 10, 11, 12, 1, 4, 9\}$,
$\pi_{12}=\{2, 3, 6, 7, 8, 5, 10, 11, 12, 9, 4, 9\}$,
$\pi_{12}=\{2, 3, 6, 7, 8, 9, 4, 1, 12, 5, 10, 11\}$,
$\pi_{12}=\{2, 3, 6, 7, 8, 9, 4, 11, 12, 1, 10, 5\}$,
$\pi_{12}=\{2, 3, 6, 7, 8, 9, 10, 5, 12, 1, 4, 11\}$,
$\pi_{12}=\{2, 3, 6, 7, 8, 9, 10, 11, 12, 5, 4, 1\}$,
$\pi_{12}=\{2, 3, 6, 7, 8, 9, 12, 1, 4, 11, 10, 5\}$,
$\pi_{12}=\{2, 3, 6, 7, 8, 9, 12, 5, 4, 1, 10, 11\}$,
$\pi_{12}=\{2, 3, 6, 7, 8, 9, 12, 5, 10, 11, 4, 1\}$,
$\pi_{12}=\{2, 3, 6, 7, 10, 1, 4, 9, 12, 5, 8, 11\}$,
$\pi_{12}=\{2, 3, 6, 7, 10, 1, 4, 11, 12, 9, 8, 5\}$,
$\pi_{12}=\{2, 3, 6, 7, 10, 1, 12, 9, 8, 5, 4, 11\}$,
$\pi_{12}=\{2, 3, 6, 7, 10, 1, 12, 9, 8, 11, 4, 5\}$,
$\pi_{12}=\{2, 3, 6, 7, 10, 5, 12, 9, 8, 11, 4, 1\}$,
$\pi_{12}=\{2, 3, 6, 7, 10, 11, 4, 5, 8, 1, 12, 9\}$,
$\pi_{12}=\{2, 3, 6, 7, 10, 11, 4, 5, 12, 9, 8, 1\}$,
$\pi_{12}=\{2, 3, 6, 7, 10, 11, 4, 9, 12, 1, 8, 5\}$,
$\pi_{12}=\{2, 3, 6, 7, 10, 11, 8, 9, 12, 1, 4, 5\}$,
$\pi_{12}=\{2, 3, 6, 7, 10, 11, 12, 1, 4, 9, 8, 5\}$,
$\pi_{12}=\{2, 3, 6, 7, 10, 11, 12, 9, 4, 1, 8, 5\}$,
$\pi_{12}=\{2, 3, 6, 7, 10, 11, 12, 9, 4, 5, 8, 1\}$,
$\pi_{12}=\{2, 3, 6, 7, 10, 11, 12, 9, 8, 1, 4, 5\}$,
$\pi_{12}=\{2, 3, 6, 7, 10, 11, 12, 9, 8, 5, 4, 1\}$,
$\pi_{12}=\{4, 1, 2, 5, 8, 3, 6, 9, 12, 7, 10, 11\}$,
$\pi_{12}=\{4, 1, 2, 5, 8, 9, 10, 3, 12, 7, 6, 11\}$,
$\pi_{12}=\{4, 1, 2, 5, 8, 9, 10, 7, 12, 3, 6, 11\}$,
$\pi_{12}=\{4, 1, 2, 5, 8, 9, 12, 3, 6, 7, 10, 11\}$,
$\pi_{12}=\{4, 1, 2, 5, 8, 9, 12, 7, 6, 3, 10, 11\}$,
$\pi_{12}=\{4, 1, 6, 3, 2, 7, 10, 11, 12, 9, 8, 5\}$,
$\pi_{12}=\{4, 1, 6, 7, 2, 9, 12, 5, 8, 11, 10, 3\}$,
$\pi_{12}=\{4, 1, 6, 7, 8, 3, 10, 11, 12, 9, 2, 5\}$,
$\pi_{12}=\{4, 1, 6, 7, 8, 5, 10, 11, 12, 3, 2, 9\}$,
$\pi_{12}=\{4, 1, 6, 7, 8, 9, 12, 3, 2, 11, 10, 5\}$,
$\pi_{12}=\{4, 1, 6, 7, 10, 3, 12, 5, 8, 11, 2, 9\}$,
$\pi_{12}=\{4, 1, 6, 7, 10, 3, 12, 9, 2, 11, 8, 5\}$,
$\pi_{12}=\{4, 1, 6, 7, 10, 5, 12, 9, 2, 11, 8, 3\}$,
$\pi_{12}=\{4, 1, 6, 7, 10, 11, 2, 5, 12, 3, 8, 9\}$,
$\pi_{12}=\{4, 1, 6, 7, 10, 11, 2, 5, 12, 9, 8, 3\}$,
$\pi_{12}=\{4, 1, 6, 7, 10, 11, 2, 9, 12, 5, 8, 3\}$,
$\pi_{12}=\{4, 1, 6, 7, 10, 11, 12, 3, 8, 5, 2, 9\}$,
$\pi_{12}=\{4, 1, 6, 7, 10, 11, 12, 5, 2, 3, 8, 9\}$,
$\pi_{12}=\{4, 1, 6, 7, 10, 11, 12, 9, 2, 3, 8, 5\}$,
$\pi_{12}=\{4, 1, 6, 7, 10, 11, 12, 9, 2, 5, 8, 3\}$,
$\pi_{12}=\{4, 1, 6, 7, 10, 11, 12, 9, 8, 3, 2, 5\}$, or
$\pi_{12}=\{4, 1, 6, 7, 10, 11, 12, 9, 8, 5, 2, 3\}$;
if the k strings are 14 strings,
$\pi_{14}=\{2, 3, 10, 5, 4, 7, 14, 9, 8, 11, 12, 13, 6, 1\}$,
$\pi_{14}=\{2, 3, 10, 5, 14, 7, 8, 9, 6, 11, 4, 13, 12, 1\}$,
$\pi_{14}=\{2, 3, 12, 5, 4, 7, 14, 9, 10, 11, 8, 13, 6, 1\}$,
$\pi_{14}=\{6, 3, 2, 5, 12, 7, 4, 9, 14, 11, 10, 13, 8, 1\}$,
$\pi_{14}=\{6, 3, 10, 5, 2, 7, 14, 9, 8, 11, 4, 13, 12, 1\}$,
$\pi_{14}=\{6, 3, 10, 5, 4, 7, 2, 9, 14, 11, 8, 13, 12, 1\}$,
$\pi_{14}=\{6, 3, 14, 5, 12, 7, 4, 9, 2, 11, 10, 13, 8, 1\}$,
$\pi_{14}=\{2, 3, 8, 5, 4, 7, 14, 9, 6, 13, 10, 11, 12, 1\}$,
$\pi_{14}=\{2, 3, 8, 5, 6, 7, 12, 9, 4, 13, 14, 11, 10, 1\}$,
$\pi_{14}=\{2, 3, 8, 5, 12, 7, 14, 9, 6, 13, 4, 11, 10, 1\}$,
$\pi_{14}=\{2, 3, 10, 5, 4, 7, 8, 9, 12, 13, 14, 11, 6, 1\}$,
$\pi_{14}=\{2, 3, 10, 5, 6, 7, 12, 9, 8, 13, 14, 11, 4, 1\}$,
$\pi_{14}=\{2, 3, 10, 5, 12, 7, 8, 9, 6, 13, 14, 11, 4, 1\}$,
$\pi_{14}=\{2, 3, 12, 5, 10, 7, 4, 9, 8, 13, 14, 11, 6, 1\}$,
$\pi_{14}=\{2, 3, 12, 5, 10, 7, 6, 9, 4, 13, 14, 11, 8, 1\}$,
$\pi_{14}=\{2, 3, 12, 5, 14, 7, 8, 9, 6, 13, 10, 11, 4, 1\}$,
$\pi_{14}=\{2, 3, 14, 5, 10, 7, 6, 9, 4, 13, 8, 11, 12, 1\}$,
$\pi_{14}=\{2, 3, 14, 5, 10, 7, 12, 9, 8, 13, 4, 11, 6, 1\}$,
$\pi_{14}=\{2, 3, 8, 5, 10, 7, 14, 11, 4, 9, 6, 1, 12, 13\}$,
$\pi_{14}=\{2, 3, 10, 5, 4, 7, 14, 11, 8, 9, 6, 1, 12, 13\}$
$\pi_{14}=\{2, 3, 10, 5, 12, 7, 4, 11, 6, 9, 14, 1, 8, 13\}$,
$\pi_{14}=\{2, 3, 10, 5, 14, 7, 4, 11, 6, 9, 8, 1, 12, 13\}$,
$\pi_{14}=\{2, 3, 10, 5, 14, 7, 6, 11, 8, 9, 4, 1, 12, 13\}$,
$\pi_{14}=\{6, 3, 2, 5, 12, 7, 10, 11, 8, 9, 14, 1, 4, 13\}$,
$\pi_{14}=\{6, 3, 10, 5, 2, 7, 14, 11, 12, 9, 8, 1, 4, 13\}$,
$\pi_{14}=\{6, 3, 10, 5, 4, 7, 2, 11, 8, 9, 14, 1, 12, 13\}$,
$\pi_{14}=\{6, 3, 10, 5, 12, 7, 4, 11, 8, 9, 14, 1, 2, 13\}$,
$\pi_{14}=\{6, 3, 10, 5, 14, 7, 4, 11, 2, 9, 8, 1, 12, 13\}$,
$\pi_{14}=\{6, 3, 12, 5, 10, 7, 14, 11, 4, 9, 8, 1, 2, 13\}$,
$\pi_{14}=\{8, 3, 2, 5, 10, 7, 4, 11, 12, 9, 14, 1, 6, 13\}$,
$\pi_{14}=\{8, 3, 2, 5, 10, 7, 6, 11, 12, 9, 14, 1, 4, 13\}$,
$\pi_{14}=\{2, 3, 8, 5, 4, 7, 10, 11, 12, 13, 6, 1, 14, 9\}$, $\pi_{14}$={2, 3, 10, 5, 4, 7, 8, 11, 12, 13, 14, 1, 6, 9},
$\pi_{14}$={2, 3, 10, 5, 12, 7, 4, 11, 6, 13, 8, 1, 14, 9},
$\pi_{14}$={8, 3, 2, 5, 10, 7, 6, 11, 4, 13, 14, 1, 12, 9},
$\pi_{14}$={8, 3, 2, 5, 10, 7, 6, 11, 12, 13, 14, 1, 4, 9},
$\pi_{14}$={2, 3, 12, 5, 4, 9, 6, 7, 14, 1, 8, 13, 10, 11},
$\pi_{14}$={2, 3, 12, 5, 8, 9, 14, 7, 6, 1, 4, 13, 10, 11},
$\pi_{14}$={2, 3, 8, 5, 6, 9, 10, 11, 14, 1, 4, 13, 12, 7},
$\pi_{14}$={2, 3, 8, 5, 14, 9, 6, 11, 4, 1, 12, 13, 10, 7},
$\pi_{14}$={8, 3, 2, 5, 14, 9, 6, 11, 12, 1, 4, 13, 10, 7},
$\pi_{14}$={2, 3, 10, 7, 4, 5, 14, 1, 6, 11, 8, 13, 12, 9},
$\pi_{14}$={2, 3, 10, 7, 12, 5, 6, 1, 14, 11, 8, 13, 4, 9}, or
$\pi_{14}$={2, 3, 10, 7, 14, 5, 4, 1, 8, 11, 6, 13, 12, 9};
if the k strings are 16 strings,
$\pi_{16}$={2, 3, 10, 5, 16, 7, 6, 9, 14, 11, 8, 15, 12, 13, 4, 1},
$\pi_{16}$={2, 3, 12, 5, 14, 7, 16, 9, 6, 11, 10, 15, 8, 13, 4, 1},
$\pi_{16}$={2, 3, 12, 5, 10, 7, 8, 9, 16, 13, 6, 11, 4, 1, 14, 15},
$\pi_{16}$={2, 3, 12, 5, 10, 7, 16, 9, 6, 13, 8, 11, 4, 1, 14, 15},
$\pi_{16}$={6, 3, 10, 5, 2, 7, 12, 9, 16, 13, 4, 11, 8, 1, 14, 15},
$\pi_{16}$={6, 3, 10, 5, 12, 7, 16, 9, 4, 13, 2, 11, 8, 1, 14, 15},
$\pi_{16}$={6, 3, 12, 5, 2, 7, 16, 9, 4, 13, 14, 11, 8, 1, 10, 15},
$\pi_{16}$={2, 3, 10, 5, 12, 7, 8, 9, 16, 13, 14, 15, 4, 1, 6, 11},
$\pi_{16}$={2, 3, 12, 5, 4, 7, 8, 9, 16, 13, 6, 15, 10, 1, 14, 11},
$\pi_{16}$={2, 3, 12, 5, 10, 7, 8, 9, 16, 13, 14, 15, 4, 1, 6, 11},
$\pi_{16}$={2, 3, 12, 5, 10, 7, 8, 9, 16, 13, 14, 15, 6, 1, 4, 11},
$\pi_{16}$={2, 3, 12, 5, 10, 7, 16, 9, 6, 13, 8, 15, 4, 1, 14, 11},
$\pi_{16}$={2, 3, 10, 5, 14, 7, 8, 11, 6, 9, 16, 1, 12, 15, 4, 13},
$\pi_{16}$={6, 3, 14, 5, 2, 7, 10, 11, 12, 9, 16, 1, 8, 15, 4, 13},
$\pi_{16}$={8, 3, 14, 5, 12, 9, 4, 7, 16, 1, 10, 11, 2, 15, 6, 13},
$\pi_{16}$={8, 3, 14, 5, 12, 9, 10, 7, 16, 1, 4, 11, 6, 15, 2, 13},
$\pi_{16}$={2, 3, 12, 5, 16, 9, 4, 7, 8, 1, 10, 13, 6, 15, 14, 11},
$\pi_{16}$={2, 3, 8, 5, 16, 9, 14, 11, 4, 1, 12, 13, 10, 15, 6, 7},
$\pi_{16}$={2, 3, 10, 5, 8, 9, 6, 11, 16, 1, 4, 13, 14, 15, 12, 7},
$\pi_{16}$={6, 3, 2, 7, 12, 5, 14, 1, 4, 9, 16, 13, 8, 15, 10, 11},
$\pi_{16}$={6, 3, 12, 7, 4, 5, 16, 1, 14, 9, 10, 13, 2, 15, 8, 11},
$\pi_{16}$={2, 3, 6, 7, 8, 9, 12, 1, 16, 5, 10, 13, 14, 15, 4, 11}, or
$\pi_{16}$={6, 3, 12, 7, 14, 9, 16, 1, 4, 5, 10, 13, 2, 15, 8, 11}.

5. The information processing method according to claim 4, further comprising:

receiving a plurality of extended keys generated from the key data and ciphertext data; and repeating the taking and XORing a plural number of times to decrypt the ciphertext data.

6. A non-transient computer-readable storage medium storing a program that causes a computer to execute:

taking a k/2-number of odd-numbered string data $B_i$ (i=1, 3, . . . , k−1), k being an even number not smaller than 6, out of a k-number of string data {$B_1$, $B_2$, . . . , $B_k$}, as intermediate data $W_i$, and XORing data transformed from the odd-numbered string data $B_i$ based on a bijective F-function, in which an as-transformed value is determined responsive to a value of key data, and even-numbered string data $B_{i+1}$, to give intermediate data $W_{i+1}$;

storing a program that causes the computer to execute repeating the taking and XORing a plural number of times;

receiving a plurality of extended keys generated from the key data and plaintext data; and repeating the taking and XORing a plural number of times to encrypt the plaintext data;

the intermediate data $W_x$ (x=1, 2, . . . , k) with $B_{p[x]}$, a permutation being expressed by $\pi_k$={p[0], p[1], . . . , p[k]}, wherein if the k strings are six strings,
$\pi_6$={2, 3, 6, 1, 4, 5};

if the k strings are eight strings,
$\pi_8$={2, 3, 6, 7, 8, 5, 4, 1},
$\pi_8$={4, 5, 2, 3, 8, 1, 6, 7}, or
$\pi_8$={2, 5, 4, 7, 8, 1, 6, 3};
if the k strings are ten strings,
$n_{10}$={2, 3, 10, 5, 4, 9, 6, 7, 8, 1},
$\pi_{10}$={2, 3, 10, 5, 8, 9, 4, 7, 6, 1},
$\pi_{10}$={6, 3, 2, 7, 4, 5, 10, 1, 8, 9},
$\pi_{10}$={2, 3, 6, 7, 8, 9, 4, 1, 10, 5}, or
$\pi_{10}$={2, 5, 8, 3, 10, 1, 4, 9, 6, 7};
if the k strings are 12 strings,
$\pi_{12}$={2, 3, 4, 5, 8, 1, 10, 11, 6, 7, 12, 9},
$\pi_{12}$={2, 3, 4, 5, 8, 9, 10, 11, 6, 1, 12, 7},
$\pi_{12}$={2, 3, 6, 1, 4, 7, 10, 5, 8, 11, 12, 9},
$\pi_{12}$={2, 3, 6, 1, 4, 7, 10, 11, 12, 9, 8, 5},
$\pi_{12}$={2, 3, 6, 1, 8, 9, 4, 5, 12, 7, 10, 11},
$\pi_{12}$={2, 3, 6, 1, 8, 9, 4, 11, 10, 7, 12, 5},
$\pi_{12}$={2, 3, 6, 1, 8, 9, 10, 5, 4, 11, 12, 7},
$\pi_{12}$={2, 3, 6, 1, 8, 9, 10, 11, 4, 7, 12, 5},
$\pi_{12}$={2, 3, 6, 7, 4, 9, 10, 11, 12, 1, 8, 5},
$\pi_{12}$={2, 3, 6, 7, 4, 9, 12, 1, 8, 5, 10, 11},
$\pi_{12}$={2, 3, 6, 7, 4, 9, 12, 5, 8, 11, 10, 1},
$\pi_{12}$={2, 3, 6, 7, 8, 1, 10, 11, 4, 5, 12, 9},
$\pi_{12}$={2, 3, 6, 7, 8, 1, 10, 11, 12, 5, 4, 9},
$\pi_{12}$={2, 3, 6, 7, 8, 5, 10, 11, 4, 1, 12, 9},
$\pi_{12}$={2, 3, 6, 7, 8, 5, 10, 11, 12, 1, 4, 9},
$\pi_{12}$={2, 3, 6, 7, 8, 5, 10, 11, 12, 9, 4, 1},
$\pi_{12}$={2, 3, 6, 7, 8, 9, 4, 1, 12, 5, 10, 11},
$\pi_{12}$={2, 3, 6, 7, 8, 9, 4, 11, 12, 1, 10, 5},
$\pi_{12}$={2, 3, 6, 7, 8, 9, 10, 5, 12, 1, 4, 11},
$\pi_{12}$={2, 3, 6, 7, 8, 9, 10, 11, 12, 5, 4, 1},
$\pi_{12}$={2, 3, 6, 7, 8, 9, 12, 1, 4, 11, 10, 5},
$\pi_{12}$={2, 3, 6, 7, 8, 9, 12, 5, 4, 1, 10, 11},
$\pi_{12}$={2, 3, 6, 7, 8, 9, 12, 5, 10, 11, 4, 1},
$\pi_{12}$={2, 3, 6, 7, 10, 1, 4, 9, 12, 5, 8, 11},
$\pi_{12}$={2, 3, 6, 7, 10, 1, 4, 11, 12, 9, 8, 5},
$\pi_{12}$={2, 3, 6, 7, 10, 1, 12, 9, 8, 5, 4, 11},
$\pi_{12}$={2, 3, 6, 7, 10, 1, 12, 9, 8, 11, 4, 5},
$\pi_{12}$={2, 3, 6, 7, 10, 5, 12, 9, 8, 11, 4, 1},
$\pi_{12}$={2, 3, 6, 7, 10, 11, 4, 5, 8, 1, 12, 9},
$\pi_{12}$={2, 3, 6, 7, 10, 11, 4, 5, 12, 9, 8, 1},
$\pi_{12}$={2, 3, 6, 7, 10, 11, 4, 9, 12, 1, 8, 5},
$\pi_{12}$={2, 3, 6, 7, 10, 11, 8, 9, 12, 1, 4, 5},
$\pi_{12}$={2, 3, 6, 7, 10, 11, 12, 1, 4, 9, 8, 5},
$\pi_{12}$={2, 3, 6, 7, 10, 11, 12, 9, 4, 5, 8, 1},
$\pi_{12}$={2, 3, 6, 7, 10, 11, 12, 9, 4, 5, 8, 1},
$\pi_{12}$={2, 3, 6, 7, 10, 11, 12, 9, 8, 1, 4, 5},
$\pi_{12}$={2, 3, 6, 7, 10, 11, 12, 9, 8, 5, 4, 1},
$\pi_{12}$={4, 1, 2, 5, 8, 3, 6, 9, 12, 7, 10, 11},
$\pi_2$={4, 1, 2, 5, 8, 9, 10, 3, 12, 7, 6, 11},
$\pi_{12}$={4, 1, 2, 5, 8, 9, 10, 7, 12, 3, 6, 11},
$\pi_{12}$={4, 1, 2, 5, 8, 9, 12, 3, 6, 7, 10, 11},
$\pi_{12}$={4, 1, 2, 5, 8, 9, 12, 7, 6, 3, 10, 11},
$\pi_{12}$={4, 1, 6, 3, 2, 7, 10, 11, 12, 9, 8, 5},
$\pi_{12}$={4, 1, 6, 7, 2, 9, 12, 5, 8, 11, 10, 3},
$\pi_{12}$={4, 1, 6, 7, 8, 3, 10, 11, 12, 9, 2, 5},
$\pi_{12}$={4, 1, 6, 7, 8, 5, 10, 11, 12, 3, 2, 9},
$\pi_{12}$={4, 1, 6, 7, 8, 9, 12, 3, 2, 11, 10, 5},
$\pi_{12}$={4, 1, 6, 7, 10, 3, 12, 5, 8, 11, 2, 9},
$\pi_{12}$={4, 1, 6, 7, 10, 3, 12, 9, 2, 11, 8, 5},
$\pi_{12}$={4, 1, 6, 7, 10, 5, 12, 9, 2, 11, 8, 3},
$\pi_{12}$={4, 1, 6, 7, 10, 11, 2, 5, 12, 3, 8, 9},
$\pi_{12}$={4, 1, 6, 7, 10, 11, 2, 5, 12, 9, 8, 3},
$\pi_{12}$={4, 1, 6, 7, 10, 11, 2, 9, 12, 5, 8, 3},
$\pi_{12}$={4, 1, 6, 7, 10, 11, 12, 3, 8, 5, 2, 9},
$\pi_{12}$={4, 1, 6, 7, 10, 11, 12, 5, 2, 3, 8, 9},
$\pi_{12}$={4, 1, 6, 7, 10, 11, 12, 9, 2, 3, 8, 5}, $\pi_{12}=\{4, 1, 6, 7, 10, 11, 12, 9, 2, 5, 8, 3\}$,
$\pi_{12}=\{4, 1, 6, 7, 10, 11, 12, 9, 8, 3, 2, 5\}$, or
$\pi_{12}=\{4, 1, 6, 7, 10, 11, 12, 9, 8, 5, 2, 3\}$;
if the k strings are 14 strings,
$\pi_{14}=\{2, 3, 10, 5, 4, 7, 14, 9, 8, 11, 12, 13, 6, 1\}$,
$\pi_{14}=\{2, 3, 10, 5, 14, 7, 8, 9, 6, 11, 4, 13, 12, 1\}$,
$\pi_{14}=\{2, 3, 12, 5, 4, 7, 14, 9, 10, 11, 8, 13, 6, 1\}$,
$\pi_{14}=\{6, 3, 2, 5, 12, 7, 4, 9, 14, 11, 10, 13, 8, 1\}$,
$\pi_{14}=\{6, 3, 10, 5, 2, 7, 14, 9, 8, 11, 4, 13, 12, 1\}$,
$\pi_{14}=\{6, 3, 10, 5, 4, 7, 2, 9, 14, 11, 8, 13, 12, 1\}$,
$\pi_{14}=\{6, 3, 14, 5, 12, 7, 4, 9, 2, 11, 10, 13, 8, 1\}$,
$\pi_{14}=\{2, 3, 8, 5, 4, 7, 14, 9, 6, 13, 10, 11, 12, 1\}$,
$\pi_{14}=\{2, 3, 8, 5, 6, 7, 12, 9, 4, 13, 14, 11, 10, 1\}$,
$\pi_{14}=\{2, 3, 8, 5, 12, 7, 14, 9, 6, 13, 4, 11, 10, 1\}$,
$\pi_{14}=\{2, 3, 10, 5, 4, 7, 8, 9, 12, 13, 14, 11, 6, 1\}$,
$\pi_{14}=\{2, 3, 10, 5, 6, 7, 12, 9, 8, 13, 14, 11, 4, 1\}$,
$\pi_{14}=\{2, 3, 10, 5, 12, 7, 8, 9, 6, 13, 14, 11, 4, 1\}$,
$\pi_{14}=\{2, 3, 12, 5, 10, 7, 4, 9, 8, 13, 14, 11, 6, 1\}$,
$\pi_{14}=\{2, 3, 12, 5, 10, 7, 6, 9, 4, 13, 14, 11, 8, 1\}$,
$\pi_{14}=\{2, 3, 12, 5, 14, 7, 8, 9, 6, 13, 10, 11, 4, 1\}$,
$\pi_{14}=\{2, 3, 14, 5, 10, 7, 6, 9, 4, 13, 8, 11, 12, 1\}$,
$\pi_{14}=\{2, 3, 14, 5, 10, 7, 12, 9, 8, 13, 4, 11, 6, 1\}$,
$\pi_{14}=\{2, 3, 8, 5, 10, 7, 14, 11, 4, 9, 6, 1, 12, 13\}$,
$\pi_{14}=\{2, 3, 10, 5, 4, 7, 14, 11, 8, 9, 6, 1, 12, 13\}$
$\pi_{14}=\{2, 3, 10, 5, 12, 7, 4, 11, 6, 9, 14, 1, 8, 13\}$,
$\pi_{14}=\{2, 3, 10, 5, 14, 7, 4, 11, 6, 9, 8, 1, 12, 13\}$,
$\pi_{14}=\{2, 3, 10, 5, 14, 7, 6, 11, 8, 9, 4, 1, 12, 13\}$,
$\pi_{14}=\{6, 3, 2, 5, 12, 7, 10, 11, 8, 9, 14, 1, 4, 13\}$,
$\pi_{14}=\{6, 3, 10, 5, 2, 7, 14, 11, 12, 9, 8, 1, 4, 13\}$,
$\pi_{14}=\{6, 3, 10, 5, 4, 7, 2, 11, 8, 9, 14, 1, 12, 13\}$,
$\pi_{14}=\{6, 3, 10, 5, 12, 7, 4, 11, 8, 9, 14, 1, 2, 13\}$,
$\pi_{14}=\{6, 3, 10, 5, 14, 7, 4, 11, 2, 9, 8, 1, 12, 13\}$,
$\pi_{14}=\{6, 3, 12, 5, 10, 7, 14, 11, 4, 9, 8, 1, 2, 13\}$,
$\pi_{14}=\{8, 3, 2, 5, 10, 7, 4, 11, 12, 9, 14, 1, 6, 13\}$,
$\pi_{14}=\{8, 3, 2, 5, 10, 7, 6, 11, 12, 9, 14, 1, 4, 13\}$,
$\pi_{14}=\{2, 3, 8, 5, 4, 7, 10, 11, 12, 13, 6, 1, 14, 9\}$,
$\pi_{14}=\{2, 3, 10, 5, 4, 7, 8, 11, 12, 13, 14, 1, 6, 9\}$,
$\pi_{14}=\{2, 3, 10, 5, 12, 7, 4, 11, 6, 13, 8, 1, 14, 9\}$,
$\pi_{14}=\{8, 3, 2, 5, 10, 7, 6, 11, 4, 13, 14, 1, 12, 9\}$,
$\pi_{14}=\{8, 3, 2, 5, 10, 7, 6, 11, 12, 13, 14, 1, 4, 9\}$,
$\pi_{14}=\{2, 3, 12, 5, 4, 9, 6, 7, 14, 1, 8, 13, 10, 11\}$,
$\pi_{14}=\{2, 3, 12, 5, 8, 9, 14, 7, 6, 1, 4, 13, 10, 11\}$,
$\pi_{14}=\{2, 3, 8, 5, 6, 9, 10, 11, 14, 1, 4, 13, 12, 7\}$,
$\pi_{14}=\{2, 3, 8, 5, 14, 9, 6, 11, 4, 1, 12, 13, 10, 7\}$,
$\pi_{14}=\{8, 3, 2, 5, 14, 9, 6, 11, 12, 1, 4, 13, 10, 7\}$,
$\pi_{14}=\{2, 3, 10, 7, 4, 5, 14, 1, 6, 11, 8, 13, 12, 9\}$,
$\pi_{14}=\{2, 3, 10, 7, 12, 5, 6, 1, 14, 11, 8, 13, 4, 9\}$, or
$\pi_{14}=\{2, 3, 10, 7, 14, 5, 4, 1, 8, 11, 6, 13, 12, 9\}$;
if the k strings are 16 strings,
$\pi_{16}=\{2, 3, 10, 5, 16, 7, 6, 9, 14, 11, 8, 15, 12, 13, 4, 1\}$,
$\pi_{16}=\{2, 3, 12, 5, 14, 7, 16, 9, 6, 11, 10, 15, 8, 13, 4, 1\}$,
$\pi_{16}=\{2, 3, 12, 5, 10, 7, 8, 9, 16, 13, 6, 11, 4, 1, 14, 15\}$,
$\pi_{16}=\{2, 3, 12, 5, 10, 7, 16, 9, 6, 13, 8, 11, 4, 1, 14, 15\}$,
$\pi_{16}=\{6, 3, 10, 5, 2, 7, 12, 9, 16, 13, 4, 11, 8, 1, 14, 15\}$,
$\pi_{16}=\{6, 3, 10, 5, 12, 7, 16, 9, 4, 13, 2, 11, 8, 1, 14, 15\}$,
$\pi_{16}=\{6, 3, 12, 5, 2, 7, 16, 9, 4, 13, 14, 11, 8, 1, 10, 15\}$,
$\pi_{16}=\{2, 3, 10, 5, 12, 7, 8, 9, 16, 13, 14, 15, 4, 1, 6, 11\}$,
$\pi_{16}=\{2, 3, 12, 5, 4, 7, 8, 9, 16, 13, 6, 15, 10, 1, 14, 11\}$,
$\pi_{16}=\{2, 3, 12, 5, 10, 7, 8, 9, 16, 13, 14, 15, 4, 1, 6, 11\}$,
$\pi_{16}=\{2, 3, 12, 5, 10, 7, 8, 9, 16, 13, 14, 15, 6, 1, 4, 11\}$,
$\pi_{16}=\{2, 3, 12, 5, 10, 7, 16, 9, 6, 13, 8, 15, 4, 1, 14, 11\}$,
$\pi_{16}=\{2, 3, 10, 5, 14, 7, 8, 11, 6, 9, 16, 1, 12, 15, 4, 13\}$,
$\pi_{16}=\{6, 3, 14, 5, 2, 7, 10, 11, 12, 9, 16, 1, 8, 15, 4, 13\}$,
$\pi_{16}=\{8, 3, 14, 5, 12, 9, 4, 7, 16, 1, 10, 11, 2, 15, 6, 13\}$,
$\pi_{16}=\{8, 3, 14, 5, 12, 9, 10, 7, 16, 1, 4, 11, 6, 15, 2, 13\}$,
$\pi_{16}=\{2, 3, 12, 5, 16, 9, 4, 7, 8, 1, 10, 13, 6, 15, 14, 11\}$,
$\pi_{16}=\{2, 3, 8, 5, 16, 9, 14, 11, 4, 1, 12, 13, 10, 15, 6, 7\}$,
$\pi_{16}=\{2, 3, 10, 5, 8, 9, 6, 11, 16, 1, 4, 13, 14, 15, 12, 7\}$,
$\pi_{16}=\{6, 3, 2, 7, 12, 5, 14, 1, 4, 9, 16, 13, 8, 15, 10, 11\}$,
$\pi_{16}=\{6, 3, 12, 7, 4, 5, 16, 1, 14, 9, 10, 13, 2, 15, 8, 11\}$,
$\pi_{16}=\{2, 3, 6, 7, 8, 9, 12, 1, 16, 5, 10, 13, 14, 15, 4, 11\}$, or
$\pi_{16}=\{6, 3, 12, 7, 14, 9, 16, 1, 4, 5, 10, 13, 2, 15, 8, 11\}$.

7. The medium according to claim 6, storing a program that causes the computer to execute:
receiving a plurality of extended keys generated from the key data and ciphertext data; and
repeating the taking and XORing a plural number of times to decrypt the ciphertext data.

* * * * *

UNITED STATES PATENT AND TRADEMARK OFFICE
CERTIFICATE OF CORRECTION

PATENT NO. : 8,731,189 B2
APPLICATION NO. : 13/504421
DATED : May 20, 2014
INVENTOR(S) : Tomoyasu Suzaki et al.

It is certified that error appears in the above-identified patent and that said Letters Patent is hereby corrected as shown below:

In the specification

Column 5, Line 29: Delete "$B_1$" and insert -- $B_i$ --

Column 5, Line 33: Delete "$B_1$" and insert -- $B_i$ --

Column 5, Line 47: Delete "$B_1$" and insert -- $B_i$ --

Column 5, Line 51: Delete "$B_1$" and insert -- $B_i$ --

Column 8, Line 15: Delete "14," and insert -- 14, 9, --

Column 10, Line 40: Delete "$W_i$" and insert -- $W_1$ --

Column 10, Line 46: Delete "m=625" and insert -- m= --

Column 12, Line 17: Delete "14," and insert -- 14, 9, --

Column 12, Line 26: Delete "112," and insert -- 1, 12, --

Column 12, Line 27: Delete "112," and insert -- 1, 12, --

Column 12, Line 28: Delete "14," and insert -- 14, 1, --

Column 12, Line 29: Delete "112," and insert -- 1, 12, --

Column 12, Line 30: Delete "112," and insert -- 1, 12, --

Column 12, Line 41: Delete "12," and insert -- 12, 7, --

In the claims

Column 17, Line 21: In Claim 1, delete "11}," and insert -- 1}, --

Column 18, Line 14: In Claim 1, delete "13}" and insert -- 13}, --

Column 19, Line 58: In Claim 4, delete "9}," and insert -- 1}, --

Column 20, Line 55: In Claim 4, delete "13}" and insert -- 13}, --

Column 22, Line 6: In Claim 6, delete "$n_{10}=$" and insert -- $\pi_{10}=$ --

Column 22, Line 50: In Claim 6, delete "$\pi_2=$" and insert -- $\pi_{12}=$ --

Signed and Sealed this
Eleventh Day of November, 2014

Michelle K. Lee
*Deputy Director of the United States Patent and Trademark Office*